US012699008B2

(12) United States Patent (10) Patent No.: US 12,699,008 B2
Blosser (45) Date of Patent: Aug. 4, 2026

(54) TEST SYSTEMS CONFIGURED TO TEST DEVICES AT DIFFERENT TEMPERATURES

(71) Applicant: Teradyne, Inc., North Reading, MA (US)

(72) Inventor: Nathan J. Blosser, Beverly, MA (US)

(73) Assignee: Teradyne, Inc., North Reading, MA (US)

( * ) Notice: Subject to any disclaimer, the term of this patent is extended or adjusted under 35 U.S.C. 154(b) by 473 days.

(21) Appl. No.: 18/197,445

(22) Filed: May 15, 2023

(65) Prior Publication Data

US 2024/0385052 A1 Nov. 21, 2024

(51) Int. Cl.
*G01K 1/20* (2006.01)
*G01K 1/26* (2006.01)

(52) U.S. Cl.
CPC ..................................... *G01K 1/20* (2013.01);
*G01K 1/26* (2013.01)

(58) Field of Classification Search
CPC .......... G01K 1/20; G01K 13/00; G01K 13/02;
G01K 1/026; G01K 17/06; G01R
31/2868; G01R 31/2877; G01R 31/2874;
G01R 31/2875; G01R 1/0416; G01R
31/27; G01R 31/2849; G01R 1/0458;
G01R 31/2817; G01R 31/003; G01R
31/26; G01R 31/2896; G01R 31/36;
G06F 1/20; G06F 2200/201; G06F 1/206;
G06F 1/181; G06F 11/3058; G11B
33/142; G11B 33/144; G11B 33/1406;
G11B 33/022
See application file for complete search history.

(56) References Cited

U.S. PATENT DOCUMENTS

| | | | |
|---|---|---|---|
| 557,186 | A | 3/1896 | Cahill |
| 2,224,407 | A | 12/1940 | Passur |
| 2,380,026 | A | 7/1945 | Clarke |
| 2,631,775 | A | 3/1953 | Gordon |
| 2,635,524 | A | 4/1953 | Jenkins |
| 3,120,166 | A | 2/1964 | Lyman |
| 3,360,032 | A | 12/1967 | Sherwood |

(Continued)

FOREIGN PATENT DOCUMENTS

| | | |
|---|---|---|
| AU | 583716 | 5/1989 |
| CN | 1177187 | 3/1998 |

(Continued)

OTHER PUBLICATIONS

International Search Report and Written Opinion received for PCT Patent Application No. PCT/US2024/028105, mailed on Aug. 23, 2024, 11 pages.

(Continued)

*Primary Examiner* — Vinh P Nguyen
(74) *Attorney, Agent, or Firm* — ARENTFOX SCHIFF LLP

(57) ABSTRACT

An example test system includes a plenum including an air inlet and a rack including slots to hold devices under test. The rack is adjacent to the plenum. The slots are arranged on the rack in a matrix such that part of each device held in a slot borders the plenum and is in fluid communication with the air inlet. One or more blowers are configured to force temperature-conditioned air into the air inlet of the plenum to thereby increase air pressure in the plenum and force the temperature-conditioned air over the devices and out of the plenum.

26 Claims, 7 Drawing Sheets

(56)                    References Cited

U.S. PATENT DOCUMENTS

| | | |
|---|---|---|
| 3,364,838 A | 1/1968 | Bradley |
| 3,517,601 A | 6/1970 | Courchesne |
| 3,845,286 A | 10/1974 | Aronstein et al. |
| 4,147,299 A | 4/1979 | Freeman |
| 4,233,644 A | 11/1980 | Hwang et al. |
| 4,336,748 A | 6/1982 | Martin et al. |
| 4,379,259 A | 4/1983 | Varadi et al. |
| 4,477,127 A | 10/1984 | Kume |
| 4,495,545 A | 1/1985 | Dufresne et al. |
| 4,526,318 A | 7/1985 | Fleming et al. |
| 4,620,248 A | 10/1986 | Gitzendanner |
| 4,648,007 A | 3/1987 | Garner |
| 4,654,727 A | 3/1987 | Blum et al. |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. |
| 4,688,124 A | 8/1987 | Scribner et al. |
| 4,713,714 A | 12/1987 | Gatti et al. |
| 4,739,444 A | 4/1988 | Zushi et al. |
| 4,754,397 A | 6/1988 | Varaiya et al. |
| 4,768,285 A | 9/1988 | Woodman, Jr. |
| 4,778,063 A | 10/1988 | Ueberreiter |
| 4,801,234 A | 1/1989 | Cedrone |
| 4,809,881 A | 3/1989 | Becker |
| 4,817,273 A | 4/1989 | Lape et al. |
| 4,817,934 A | 4/1989 | McCormick et al. |
| 4,851,965 A | 7/1989 | Gabuzda et al. |
| 4,881,591 A | 11/1989 | Rignall |
| 4,888,549 A | 12/1989 | Wilson et al. |
| 4,911,281 A | 3/1990 | Jenkner |
| 4,967,155 A | 10/1990 | Magnuson |
| 5,012,187 A | 4/1991 | Littlebury |
| 5,045,960 A | 9/1991 | Eding |
| 5,061,630 A | 10/1991 | Knopf et al. |
| 5,119,270 A | 6/1992 | Bolton et al. |
| 5,122,914 A | 6/1992 | Hanson |
| 5,127,684 A | 7/1992 | Klotz et al. |
| 5,128,813 A | 7/1992 | Lee |
| 5,136,395 A | 8/1992 | Ishii et al. |
| 5,143,193 A | 9/1992 | Geraci |
| 5,158,132 A | 10/1992 | Guillemot |
| 5,168,424 A | 12/1992 | Bolton et al. |
| 5,171,183 A | 12/1992 | Pollard et al. |
| 5,173,819 A | 12/1992 | Takahashi et al. |
| 5,176,202 A | 1/1993 | Richard |
| 5,205,132 A | 4/1993 | Fu |
| 5,206,772 A | 4/1993 | Hirano et al. |
| 5,207,613 A | 5/1993 | Ferchau et al. |
| 5,210,680 A | 5/1993 | Scheibler |
| 5,237,484 A | 8/1993 | Ferchau et al. |
| 5,263,537 A | 11/1993 | Plucinski et al. |
| 5,268,637 A | 12/1993 | Liken et al. |
| 5,269,698 A | 12/1993 | Singer |
| 5,295,392 A | 3/1994 | Hensel et al. |
| 5,309,323 A | 5/1994 | Gray et al. |
| 5,325,263 A | 6/1994 | Singer et al. |
| 5,343,403 A | 8/1994 | Beidle et al. |
| 5,349,486 A | 9/1994 | Sugimoto et al. |
| 5,368,072 A | 11/1994 | Cote |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. |
| 5,414,591 A | 5/1995 | Kimura et al. |
| 5,426,581 A | 6/1995 | Kishi et al. |
| 5,469,037 A | 11/1995 | McMurtrey, Sr. et al. |
| 5,477,416 A | 12/1995 | Schkrohowsky et al. |
| 5,484,012 A | 1/1996 | Hiratsuka |
| 5,486,681 A | 1/1996 | Dagnac et al. |
| 5,491,610 A | 2/1996 | Mok et al. |
| 5,543,727 A | 8/1996 | Bushard et al. |
| 5,546,250 A | 8/1996 | Diel |
| 5,557,186 A | 9/1996 | McMurtrey, Sr. et al. |
| 5,563,768 A | 10/1996 | Perdue |
| 5,570,740 A | 11/1996 | Flores et al. |
| 5,593,380 A | 1/1997 | Bittikofer |
| 5,601,141 A | 2/1997 | Gordon et al. |
| 5,604,662 A | 2/1997 | Anderson et al. |
| 5,610,893 A | 3/1997 | Soga et al. |
| 5,617,430 A | 4/1997 | Angelotti et al. |
| 5,644,705 A | 7/1997 | Stanley |
| 5,646,918 A | 7/1997 | Dimitri et al. |
| 5,654,846 A | 8/1997 | Wicks et al. |
| 5,673,029 A | 9/1997 | Behl et al. |
| 5,694,290 A | 12/1997 | Chang |
| 5,703,843 A | 12/1997 | Katsuyama et al. |
| 5,718,627 A | 2/1998 | Wicks |
| 5,718,628 A | 2/1998 | Nakazato et al. |
| 5,731,928 A | 3/1998 | Jabbari et al. |
| 5,751,549 A | 5/1998 | Eberhardt et al. |
| 5,754,365 A | 5/1998 | Beck et al. |
| 5,761,032 A | 6/1998 | Jones |
| 5,793,610 A | 8/1998 | Schmitt et al. |
| 5,811,678 A | 9/1998 | Hirano |
| 5,812,761 A | 9/1998 | Seki et al. |
| 5,819,842 A | 10/1998 | Potter et al. |
| 5,831,525 A | 11/1998 | Harvey |
| 5,851,143 A | 12/1998 | Hamid |
| 5,859,409 A | 1/1999 | Kim et al. |
| 5,859,540 A | 1/1999 | Fukumoto |
| 5,862,037 A | 1/1999 | Behl |
| 5,870,630 A | 2/1999 | Reasoner et al. |
| 5,886,639 A | 3/1999 | Behl et al. |
| 5,890,959 A | 4/1999 | Pettit et al. |
| 5,892,367 A | 4/1999 | Magee et al. |
| 5,912,799 A | 6/1999 | Grouell et al. |
| 5,913,926 A | 6/1999 | Anderson et al. |
| 5,914,856 A | 6/1999 | Morton et al. |
| 5,927,386 A | 7/1999 | Lin |
| 5,956,301 A | 9/1999 | Dimitri et al. |
| 5,959,834 A | 9/1999 | Chang |
| 5,999,356 A | 12/1999 | Dimitri et al. |
| 5,999,365 A | 12/1999 | Hasegawa et al. |
| 6,000,623 A | 12/1999 | Blatti et al. |
| 6,005,404 A | 12/1999 | Cochran et al. |
| 6,005,770 A | 12/1999 | Schmitt |
| 6,008,636 A | 12/1999 | Miller et al. |
| 6,008,984 A | 12/1999 | Cunningham et al. |
| 6,011,689 A | 1/2000 | Wrycraft |
| 6,031,717 A | 2/2000 | Baddour et al. |
| 6,034,870 A | 3/2000 | Osborn et al. |
| 6,042,348 A | 3/2000 | Aakalu et al. |
| 6,045,113 A | 4/2000 | Itakura |
| 6,055,814 A | 5/2000 | Song |
| 6,066,822 A | 5/2000 | Nemoto et al. |
| 6,067,225 A | 5/2000 | Reznikov et al. |
| 6,069,792 A | 5/2000 | Nelik |
| 6,084,768 A | 7/2000 | Bolognia |
| 6,094,342 A | 7/2000 | Dague et al. |
| 6,104,607 A | 8/2000 | Behl |
| 6,107,813 A | 8/2000 | La. |
| 6,115,250 A | 9/2000 | Schmitt |
| 6,122,131 A | 9/2000 | Jeppson |
| 6,122,232 A | 9/2000 | Schell et al. |
| 6,124,707 A | 9/2000 | Kim et al. |
| 6,129,428 A | 10/2000 | Helwig et al. |
| 6,130,817 A | 10/2000 | Flotho et al. |
| 6,144,553 A | 11/2000 | Hileman et al. |
| 6,166,901 A | 12/2000 | Gamble et al. |
| 6,169,413 B1 | 1/2001 | Pack et al. |
| 6,169,930 B1 | 1/2001 | Blachek et al. |
| 6,177,805 B1 | 1/2001 | Pih |
| 6,178,835 B1 | 1/2001 | Orriss et al. |
| 6,181,557 B1 | 1/2001 | Gatti |
| 6,185,065 B1 | 2/2001 | Hasegawa et al. |
| 6,185,097 B1 | 2/2001 | Behl |
| 6,188,191 B1 | 2/2001 | Frees et al. |
| 6,192,282 B1 | 2/2001 | Smith et al. |
| 6,193,339 B1 | 2/2001 | Behl et al. |
| 6,209,842 B1 | 4/2001 | Anderson et al. |
| 6,227,516 B1 | 5/2001 | Webster, Jr. et al. |
| 6,229,275 B1 | 5/2001 | Yamamoto |
| 6,231,145 B1 | 5/2001 | Liu |

(56) References Cited

U.S. PATENT DOCUMENTS

| | | |
|---|---|---|
| 6,233,148 B1 | 5/2001 | Shen |
| 6,236,563 B1 | 5/2001 | Buican et al. |
| 6,247,944 B1 | 6/2001 | Bolognia et al. |
| 6,249,824 B1 | 6/2001 | Henrichs |
| 6,252,769 B1 | 6/2001 | Tullstedt et al. |
| 6,262,863 B1 | 7/2001 | Ostwald et al. |
| 6,272,007 B1 | 8/2001 | Kitlas et al. |
| 6,272,767 B1 | 8/2001 | Botruff et al. |
| 6,281,677 B1 | 8/2001 | Cosci et al. |
| 6,282,501 B1 | 8/2001 | Assouad |
| 6,285,524 B1 | 9/2001 | Boigenzahn et al. |
| 6,289,678 B1 | 9/2001 | Pandolfi |
| 6,297,950 B1 | 10/2001 | Erwin |
| 6,298,672 B1 | 10/2001 | Valicoff, Jr. |
| 6,302,714 B1 | 10/2001 | Bolognia et al. |
| 6,304,839 B1 | 10/2001 | Ho et al. |
| 6,307,386 B1 | 10/2001 | Fowler et al. |
| 6,327,150 B1 | 12/2001 | Levy et al. |
| 6,330,154 B1 | 12/2001 | Fryers et al. |
| 6,351,379 B1 | 2/2002 | Cheng |
| 6,354,792 B1 | 3/2002 | Kobayashi et al. |
| 6,356,409 B1 | 3/2002 | Price et al. |
| 6,356,415 B1 | 3/2002 | Kabasawa |
| 6,384,995 B1 | 5/2002 | Smith |
| 6,388,437 B1 | 5/2002 | Wolski et al. |
| 6,388,875 B1 | 5/2002 | Chen |
| 6,388,878 B1 | 5/2002 | Chang |
| 6,389,225 B1 | 5/2002 | Malinoski et al. |
| 6,411,584 B2 | 6/2002 | Davis et al. |
| 6,421,236 B1 | 7/2002 | Montoya et al. |
| 6,434,000 B1 | 8/2002 | Pandolfi |
| 6,434,498 B1 | 8/2002 | Ulrich et al. |
| 6,434,499 B1 | 8/2002 | Ulrich et al. |
| 6,464,080 B1 | 10/2002 | Morris et al. |
| 6,467,153 B2 | 10/2002 | Butts et al. |
| 6,473,297 B1 | 10/2002 | Behl et al. |
| 6,473,301 B1 | 10/2002 | Levy et al. |
| 6,476,627 B1 | 11/2002 | Pelissier et al. |
| 6,477,044 B2 | 11/2002 | Foley et al. |
| 6,477,442 B1 | 11/2002 | Valerino, Sr. |
| 6,480,380 B1 | 11/2002 | French et al. |
| 6,480,382 B2 | 11/2002 | Cheng |
| 6,487,071 B1 | 11/2002 | Tata et al. |
| 6,489,793 B2 | 12/2002 | Jones et al. |
| 6,494,663 B2 | 12/2002 | Ostwald et al. |
| 6,525,933 B2 | 2/2003 | Eland |
| 6,526,841 B1 | 3/2003 | Wanek et al. |
| 6,535,384 B2 | 3/2003 | Huang |
| 6,537,013 B2 | 3/2003 | Emberty et al. |
| 6,544,309 B1 | 4/2003 | Hoefer et al. |
| 6,546,445 B1 | 4/2003 | Hayes |
| 6,553,532 B1 | 4/2003 | Aoki |
| 6,560,107 B1 | 5/2003 | Beck et al. |
| 6,565,163 B2 | 5/2003 | Behl et al. |
| 6,566,859 B2 | 5/2003 | Wolski et al. |
| 6,567,266 B2 | 5/2003 | Ives et al. |
| 6,568,770 B2 | 5/2003 | Gonska et al. |
| 6,570,734 B2 | 5/2003 | Ostwald et al. |
| 6,577,586 B1 | 6/2003 | Yang et al. |
| 6,577,687 B2 | 6/2003 | Hall et al. |
| 6,618,254 B2 | 9/2003 | Ives |
| 6,626,846 B2 | 9/2003 | Spencer |
| 6,628,518 B2 | 9/2003 | Behl et al. |
| 6,635,115 B1 | 10/2003 | Fairbairn et al. |
| 6,640,235 B1 | 10/2003 | Anderson |
| 6,644,982 B1 | 11/2003 | Ondricek et al. |
| 6,651,192 B1 | 11/2003 | Viglione et al. |
| 6,654,240 B1 | 11/2003 | Tseng et al. |
| 6,679,128 B2 | 1/2004 | Wanek et al. |
| 6,693,757 B2 | 2/2004 | Hayakawa et al. |
| 6,736,583 B2 | 5/2004 | Ostwald et al. |
| 6,741,529 B1 | 5/2004 | Getreuer |
| 6,746,648 B1 | 6/2004 | Mattila et al. |
| 6,751,093 B1 | 6/2004 | Hsu et al. |
| 6,791,785 B1 | 9/2004 | Messenger et al. |
| 6,791,799 B2 | 9/2004 | Fletcher |
| 6,798,651 B2 * | 9/2004 | Syring ................. G11B 33/122 |
| 6,798,972 B1 | 9/2004 | Ito et al. |
| 6,801,834 B1 | 10/2004 | Konshak et al. |
| 6,806,700 B2 | 10/2004 | Wanek et al. |
| 6,808,353 B2 | 10/2004 | Oswald |
| 6,811,427 B2 | 11/2004 | Garrett et al. |
| 6,826,046 B1 | 11/2004 | Muncaster et al. |
| 6,830,372 B2 | 12/2004 | Liu et al. |
| 6,832,929 B2 | 12/2004 | Garrett et al. |
| 6,861,861 B2 | 3/2005 | Song et al. |
| 6,862,173 B1 | 3/2005 | Konshak et al. |
| 6,867,939 B2 | 3/2005 | Katahara et al. |
| 6,892,328 B2 | 5/2005 | Klein et al. |
| 6,904,479 B2 | 6/2005 | Hall et al. |
| 6,908,330 B2 | 6/2005 | Garrett et al. |
| 6,928,336 B2 | 8/2005 | Peshkin et al. |
| 6,937,432 B2 | 8/2005 | Sri-Jayantha et al. |
| 6,957,291 B2 | 10/2005 | Moon et al. |
| 6,965,811 B2 | 11/2005 | Dickey et al. |
| 6,974,017 B2 | 12/2005 | Oseguera |
| 6,976,190 B1 | 12/2005 | Goldstone |
| 6,980,381 B2 | 12/2005 | Gray et al. |
| 6,982,872 B2 | 1/2006 | Behl et al. |
| 7,006,325 B2 | 2/2006 | Emberty et al. |
| 7,013,198 B2 | 3/2006 | Haas |
| 7,021,883 B1 | 4/2006 | Plutt et al. |
| 7,039,924 B2 | 5/2006 | Goodman et al. |
| 7,054,150 B2 | 5/2006 | Orriss et al. |
| 7,070,323 B2 | 7/2006 | Wanek et al. |
| 7,076,391 B1 | 7/2006 | Pakzad et al. |
| 7,077,614 B1 | 7/2006 | Hasper et al. |
| 7,088,541 B2 | 8/2006 | Orriss et al. |
| 7,092,251 B1 | 8/2006 | Henry |
| 7,106,582 B2 | 9/2006 | Albrecht et al. |
| 7,123,477 B2 | 10/2006 | Coglitore et al. |
| 7,126,777 B2 | 10/2006 | Flechsig et al. |
| 7,130,138 B2 | 10/2006 | Lum et al. |
| 7,134,553 B2 | 11/2006 | Stephens |
| 7,139,145 B1 | 11/2006 | Archibald et al. |
| 7,164,579 B2 | 1/2007 | Muncaster et al. |
| 7,167,360 B2 | 1/2007 | Inoue et al. |
| 7,181,458 B1 | 2/2007 | Higashi |
| 7,203,021 B1 | 4/2007 | Ryan et al. |
| 7,203,060 B2 | 4/2007 | Kay et al. |
| 7,206,201 B2 | 4/2007 | Behl et al. |
| 7,216,968 B2 | 5/2007 | Smith et al. |
| 7,219,028 B2 | 5/2007 | Bae et al. |
| 7,219,273 B2 | 5/2007 | Fisher et al. |
| 7,227,746 B2 | 6/2007 | Tanaka et al. |
| 7,232,101 B2 | 6/2007 | Wanek et al. |
| 7,243,043 B2 | 7/2007 | Shin |
| 7,248,467 B2 | 7/2007 | Sri-Jayantha et al. |
| 7,259,966 B2 | 8/2007 | Connelly, Jr. et al. |
| 7,273,344 B2 | 9/2007 | Ostwald et al. |
| 7,280,353 B2 | 10/2007 | Wendel et al. |
| 7,289,885 B2 | 10/2007 | Basham et al. |
| 7,304,855 B1 | 12/2007 | Milligan et al. |
| 7,315,447 B2 | 1/2008 | Inoue et al. |
| 7,349,205 B2 | 3/2008 | Hall et al. |
| 7,353,524 B1 | 4/2008 | Lin et al. |
| 7,385,385 B2 | 6/2008 | Magliocco et al. |
| 7,395,133 B2 | 7/2008 | Lowe |
| 7,403,451 B2 | 7/2008 | Goodman et al. |
| 7,421,623 B2 | 9/2008 | Haugh |
| 7,437,212 B2 | 10/2008 | Farchmin et al. |
| 7,447,011 B2 | 11/2008 | Wade et al. |
| 7,457,112 B2 | 11/2008 | Fukuda et al. |
| 7,467,024 B2 | 12/2008 | Flitsch |
| 7,476,362 B2 | 1/2009 | Angros |
| 7,483,269 B1 | 1/2009 | Marvin, Jr. et al. |
| 7,505,264 B2 | 3/2009 | Hall et al. |
| 7,554,811 B2 | 6/2009 | Scicluna et al. |
| 7,568,122 B2 | 7/2009 | Mechalke et al. |
| 7,570,455 B2 | 8/2009 | Deguchi et al. |
| 7,573,715 B2 | 8/2009 | Mojaver et al. |
| 7,584,851 B2 | 9/2009 | Hong et al. |
| 7,612,996 B2 | 11/2009 | Atkins et al. |
| 7,625,027 B2 | 12/2009 | Kiaie et al. |

(56) References Cited

U.S. PATENT DOCUMENTS

| | | | |
|---|---|---|---|
| 7,630,196 B2 | 12/2009 | Hall et al. | |
| 7,643,289 B2 | 1/2010 | Ye et al. | |
| 7,646,596 B2 | 1/2010 | Ng | |
| 7,729,107 B2 | 6/2010 | Atkins et al. | |
| 7,778,031 B1 | 8/2010 | Merrow et al. | |
| 7,789,267 B2 | 9/2010 | Hutchinson et al. | |
| 7,848,106 B2 | 12/2010 | Merrow | |
| 7,890,207 B2 | 2/2011 | Toscano et al. | |
| 7,904,211 B2 | 3/2011 | Merrow et al. | |
| 7,908,029 B2 | 3/2011 | Slocum | |
| 7,911,778 B2 | 3/2011 | Merrow | |
| 7,920,380 B2 | 4/2011 | Merrow et al. | |
| 7,929,303 B1 * | 4/2011 | Merrow | H05K 7/20 |
| | | | 361/679.48 |
| 7,932,734 B2 | 4/2011 | Merrow et al. | |
| 7,940,529 B2 | 5/2011 | Merrow et al. | |
| 7,945,424 B2 | 5/2011 | Garcia et al. | |
| 7,987,018 B2 | 7/2011 | Polyakov et al. | |
| 7,995,349 B2 | 8/2011 | Merrow et al. | |
| 7,996,174 B2 | 8/2011 | Garcia et al. | |
| 8,018,720 B2 * | 9/2011 | Campbell | H05K 7/20809 |
| | | | 165/185 |
| 8,041,449 B2 | 10/2011 | Noble et al. | |
| 8,086,343 B2 | 12/2011 | Slocum | |
| 8,095,234 B2 | 1/2012 | Polyakov et al. | |
| 8,102,173 B2 | 1/2012 | Merrow | |
| 8,116,079 B2 | 2/2012 | Merrow | |
| 8,117,480 B2 | 2/2012 | Merrow et al. | |
| 8,140,182 B2 | 3/2012 | Noble et al. | |
| 8,160,739 B2 | 4/2012 | Toscano et al. | |
| 8,238,099 B2 | 8/2012 | Merrow | |
| 8,279,603 B2 | 10/2012 | Merrow et al. | |
| 8,305,751 B2 | 11/2012 | Merrow | |
| 8,405,971 B2 | 3/2013 | Merrow et al. | |
| 8,466,699 B2 | 6/2013 | Merrow et al. | |
| 8,467,180 B2 | 6/2013 | Merrow et al. | |
| 8,482,915 B2 | 7/2013 | Merrow | |
| 8,499,611 B2 | 8/2013 | Merrow et al. | |
| 8,547,123 B2 | 10/2013 | Merrow et al. | |
| 8,549,912 B2 | 10/2013 | Merrow et al. | |
| 8,628,239 B2 | 1/2014 | Merrow et al. | |
| 8,631,698 B2 | 1/2014 | Merrow et al. | |
| 8,655,482 B2 | 2/2014 | Merrow | |
| 8,687,349 B2 | 4/2014 | Truebenbach | |
| 8,687,356 B2 | 4/2014 | Merrow | |
| 9,002,186 B2 | 4/2015 | Akers et al. | |
| 9,232,683 B2 * | 1/2016 | Davis | G11B 33/128 |
| 9,466,861 B2 * | 10/2016 | Harii | H01M 10/6557 |
| 9,795,055 B1 * | 10/2017 | Campbell | G06F 1/20 |
| 9,807,911 B1 * | 10/2017 | Bryan | G06F 1/20 |
| 10,401,423 B2 | 9/2019 | Akers et al. | |
| 2001/0006453 A1 | 7/2001 | Glorioso et al. | |
| 2001/0044023 A1 | 11/2001 | Johnson et al. | |
| 2001/0046118 A1 | 11/2001 | Yamanashi et al. | |
| 2001/0048590 A1 | 12/2001 | Behl et al. | |
| 2002/0030981 A1 | 3/2002 | Sullivan et al. | |
| 2002/0044416 A1 | 4/2002 | Harmon, III et al. | |
| 2002/0051338 A1 | 5/2002 | Jiang et al. | |
| 2002/0071248 A1 | 6/2002 | Huang et al. | |
| 2002/0079422 A1 | 6/2002 | Jiang | |
| 2002/0090320 A1 | 7/2002 | Burow et al. | |
| 2002/0116087 A1 | 8/2002 | Brown | |
| 2002/0161971 A1 | 10/2002 | Dimitri et al. | |
| 2002/0172004 A1 | 11/2002 | Ives et al. | |
| 2003/0035271 A1 | 2/2003 | Lelong et al. | |
| 2003/0043550 A1 | 3/2003 | Ives | |
| 2003/0206397 A1 | 11/2003 | Allgeyer et al. | |
| 2004/0165489 A1 | 8/2004 | Goodman et al. | |
| 2004/0230399 A1 | 11/2004 | Shin | |
| 2004/0236465 A1 | 11/2004 | Butka et al. | |
| 2004/0264121 A1 | 12/2004 | Orriss et al. | |
| 2005/0004703 A1 | 1/2005 | Christie | |
| 2005/0010836 A1 | 1/2005 | Bae et al. | |
| 2005/0018397 A1 | 1/2005 | Kay et al. | |
| 2005/0055601 A1 | 3/2005 | Wilson et al. | |

| | | |
|---|---|---|
| 2005/0057849 A1 | 3/2005 | Twogood et al. |
| 2005/0069400 A1 | 3/2005 | Dickey et al. |
| 2005/0109131 A1 | 5/2005 | Wanek et al. |
| 2005/0116702 A1 | 6/2005 | Wanek et al. |
| 2005/0131578 A1 | 6/2005 | Weaver |
| 2005/0179457 A1 | 8/2005 | Min et al. |
| 2005/0207059 A1 | 9/2005 | Cochrane |
| 2005/0219809 A1 | 10/2005 | Muncaster et al. |
| 2005/0225338 A1 | 10/2005 | Sands et al. |
| 2005/0270737 A1 | 12/2005 | Wilson et al. |
| 2006/0010353 A1 | 1/2006 | Haugh |
| 2006/0023331 A1 | 2/2006 | Flechsig et al. |
| 2006/0028802 A1 | 2/2006 | Shaw et al. |
| 2006/0066974 A1 | 3/2006 | Akamatsu et al. |
| 2006/0130316 A1 | 6/2006 | Takase et al. |
| 2006/0190205 A1 | 8/2006 | Klein et al. |
| 2006/0227517 A1 | 10/2006 | Zayas et al. |
| 2006/0250766 A1 | 11/2006 | Blaalid et al. |
| 2007/0034368 A1 | 2/2007 | Atkins et al. |
| 2007/0035874 A1 | 2/2007 | Wendel et al. |
| 2007/0035875 A1 | 2/2007 | Hall et al. |
| 2007/0053154 A1 | 3/2007 | Fukuda et al. |
| 2007/0082907 A1 | 4/2007 | Canada et al. |
| 2007/0127202 A1 | 6/2007 | Scicluna et al. |
| 2007/0127206 A1 | 6/2007 | Wade et al. |
| 2007/0195497 A1 | 8/2007 | Atkins |
| 2007/0248142 A1 | 10/2007 | Roundtree et al. |
| 2007/0253157 A1 | 11/2007 | Atkins et al. |
| 2007/0286045 A1 | 12/2007 | Onagi et al. |
| 2008/0007865 A1 | 1/2008 | Orriss et al. |
| 2008/0030945 A1 | 2/2008 | Mojaver et al. |
| 2008/0112075 A1 | 5/2008 | Farquhar et al. |
| 2008/0239564 A1 | 10/2008 | Farquhar et al. |
| 2008/0282275 A1 | 11/2008 | Zaczek et al. |
| 2008/0282278 A1 | 11/2008 | Barkley |
| 2009/0028669 A1 | 1/2009 | Rebstock |
| 2009/0082907 A1 | 3/2009 | Stuvel et al. |
| 2009/0122443 A1 | 5/2009 | Farquhar et al. |
| 2009/0142169 A1 | 6/2009 | Garcia et al. |
| 2009/0153992 A1 | 6/2009 | Garcia et al. |
| 2009/0153993 A1 | 6/2009 | Garcia et al. |
| 2009/0153994 A1 | 6/2009 | Merrow |
| 2009/0175705 A1 | 7/2009 | Nakao et al. |
| 2009/0261047 A1 | 10/2009 | Merrow |
| 2009/0261228 A1 | 10/2009 | Merrow |
| 2009/0261229 A1 | 10/2009 | Merrow |
| 2009/0262444 A1 | 10/2009 | Polyakov et al. |
| 2009/0262445 A1 | 10/2009 | Noble et al. |
| 2009/0262454 A1 | 10/2009 | Merrow |
| 2009/0262455 A1 | 10/2009 | Merrow |
| 2009/0265032 A1 | 10/2009 | Toscano et al. |
| 2009/0265043 A1 | 10/2009 | Merrow |
| 2009/0265136 A1 | 10/2009 | Garcia et al. |
| 2009/0297328 A1 | 12/2009 | Slocum, III |
| 2010/0083732 A1 | 4/2010 | Merrow et al. |
| 2010/0165498 A1 | 7/2010 | Merrow et al. |
| 2010/0165501 A1 | 7/2010 | Polyakov et al. |
| 2010/0168906 A1 | 7/2010 | Toscano et al. |
| 2010/0172722 A1 | 7/2010 | Noble et al. |
| 2010/0174404 A1 | 7/2010 | Slocum |
| 2010/0193661 A1 | 8/2010 | Merrow |
| 2010/0194253 A1 | 8/2010 | Merrow et al. |
| 2010/0195236 A1 | 8/2010 | Merrow et al. |
| 2010/0265609 A1 | 10/2010 | Merrow et al. |
| 2010/0265610 A1 | 10/2010 | Merrow et al. |
| 2010/0302678 A1 | 12/2010 | Merrow |
| 2011/0011844 A1 | 1/2011 | Merrow et al. |
| 2011/0012631 A1 | 1/2011 | Merrow et al. |
| 2011/0012632 A1 | 1/2011 | Merrow |
| 2011/0013362 A1 | 1/2011 | Merrow et al. |
| 2011/0013665 A1 | 1/2011 | Merrow et al. |
| 2011/0013666 A1 | 1/2011 | Merrow et al. |
| 2011/0013667 A1 | 1/2011 | Merrow et al. |
| 2011/0064546 A1 | 3/2011 | Merrow |
| 2011/0157825 A1 | 6/2011 | Merrow et al. |
| 2011/0172807 A1 | 7/2011 | Merrow |
| 2011/0185811 A1 | 8/2011 | Merrow et al. |
| 2011/0189934 A1 | 8/2011 | Merrow |
| 2011/0236163 A1 | 9/2011 | Smith et al. |

(56)         References Cited

U.S. PATENT DOCUMENTS

| | | |
|---|---|---|
| 2011/0261483 A1 | 10/2011 | Campbell et al. |
| 2011/0305132 A1 | 12/2011 | Merrow et al. |
| 2011/0310724 A1 | 12/2011 | Martino |
| 2012/0023370 A1 | 1/2012 | Truebenbach |
| 2012/0034054 A1 | 2/2012 | Polyakov et al. |
| 2012/0050903 A1 | 3/2012 | Campbell et al. |
| 2012/0106351 A1 | 5/2012 | Gohel et al. |
| 2012/0321435 A1 | 12/2012 | Truebenbach |
| 2013/0071224 A1 | 3/2013 | Merrow et al. |
| 2013/0108253 A1 | 5/2013 | Akers et al. |
| 2013/0164579 A1 | 6/2013 | Harii et al. |
| 2013/0256967 A1 | 10/2013 | Carvalho |
| 2014/0262149 A1 | 9/2014 | Merrow |
| 2017/0059635 A1 | 3/2017 | Orchanian et al. |

FOREIGN PATENT DOCUMENTS

| | | |
|---|---|---|
| CN | 1192544 | 9/1998 |
| CN | 2341188 | 9/1999 |
| DE | 3786944 | 11/1993 |
| DE | 69111634 | 5/1996 |
| DE | 69400145 | 10/1996 |
| DE | 19701548 | 8/1997 |
| DE | 19804813 | 9/1998 |
| DE | 69614460 | 6/2002 |
| DE | 69626584 | 12/2003 |
| DE | 19861388 | 8/2007 |
| EP | 0210497 | 2/1987 |
| EP | 0242970 | 10/1987 |
| EP | 0277634 | 8/1988 |
| EP | 0356977 | 3/1990 |
| EP | 0442642 | 8/1991 |
| EP | 0466073 | 1/1992 |
| EP | 0582017 | 2/1994 |
| EP | 0617570 | 9/1994 |
| EP | 0635836 | 1/1995 |
| EP | 0741508 | 11/1996 |
| EP | 0757320 | 2/1997 |
| EP | 0757351 | 2/1997 |
| EP | 0776009 | 5/1997 |
| EP | 0840476 | 5/1998 |
| EP | 1045301 | 10/2000 |
| EP | 1209557 | 5/2002 |
| EP | 1234308 | 8/2002 |
| EP | 1422713 | 5/2004 |
| EP | 1612798 | 1/2006 |
| EP | 1760722 | 3/2007 |
| GB | 2241118 | 8/1991 |
| GB | 2276275 | 9/1994 |
| GB | 2299436 | 10/1996 |
| GB | 2312984 | 11/1997 |
| GB | 2328782 | 3/1999 |
| GB | 2439844 | 1/2008 |
| JP | S61-115279 | 6/1986 |
| JP | S62-177621 | 8/1987 |
| JP | S62-239394 | 10/1987 |
| JP | S62-251915 | 11/1987 |
| JP | S63-2160 | 1/1988 |
| JP | S63-16482 | 1/1988 |
| JP | S63-62057 | 3/1988 |
| JP | S63-201946 | 8/1988 |
| JP | S63-4483 | 9/1988 |
| JP | S63-214972 | 9/1988 |
| JP | S63-269376 | 11/1988 |
| JP | S63-195697 | 12/1988 |
| JP | H01-89034 | 4/1989 |
| JP | H02-91565 | 3/1990 |
| JP | H02-98197 | 4/1990 |
| JP | H02-185784 | 7/1990 |
| JP | H02-199690 | 8/1990 |
| JP | H02-278375 | 11/1990 |
| JP | H02-297770 | 12/1990 |
| JP | H03-8086 | 1/1991 |
| JP | H03-52183 | 3/1991 |
| JP | H03-78160 | 4/1991 |
| JP | H03-105704 | 5/1991 |
| JP | H03-207947 | 9/1991 |
| JP | H03-210662 | 9/1991 |
| JP | H03-212859 | 9/1991 |
| JP | H03-214490 | 9/1991 |
| JP | H03-240821 | 10/1991 |
| JP | H03-295071 | 12/1991 |
| JP | H04-17134 | 1/1992 |
| JP | H04-143989 | 5/1992 |
| JP | H04-172658 | 6/1992 |
| JP | H04-214288 | 8/1992 |
| JP | H04-247385 | 9/1992 |
| JP | H04-259956 | 9/1992 |
| JP | H04-307440 | 10/1992 |
| JP | H04-325923 | 11/1992 |
| JP | H05-35053 | 2/1993 |
| JP | H05-35415 | 2/1993 |
| JP | H05-66896 | 3/1993 |
| JP | H05-68257 | 3/1993 |
| JP | H05-73566 | 3/1993 |
| JP | H05-73803 | 3/1993 |
| JP | H05-101603 | 4/1993 |
| JP | H05-173718 | 7/1993 |
| JP | H05-189163 | 7/1993 |
| JP | H05-204725 | 8/1993 |
| JP | H05-223551 | 8/1993 |
| JP | H06-4220 | 1/1994 |
| JP | H06-4981 | 1/1994 |
| JP | H06-162645 | 6/1994 |
| JP | H06-181561 | 6/1994 |
| JP | H06-215515 | 8/1994 |
| JP | H06-274943 | 9/1994 |
| JP | H06-314173 | 11/1994 |
| JP | H07-29364 | 1/1995 |
| JP | H07-37376 | 2/1995 |
| JP | H07-56654 | 3/1995 |
| JP | H07-111078 | 4/1995 |
| JP | H07-115497 | 5/1995 |
| JP | H07-201082 | 8/1995 |
| JP | H07-226023 | 8/1995 |
| JP | H07-230669 | 8/1995 |
| JP | H07-257525 | 10/1995 |
| JP | H07-307059 | 11/1995 |
| JP | H08-30398 | 2/1996 |
| JP | H08-30407 | 2/1996 |
| JP | H08-79672 | 3/1996 |
| JP | H08-106776 | 4/1996 |
| JP | H08-110821 | 4/1996 |
| JP | H08-167231 | 6/1996 |
| JP | H08-212015 | 8/1996 |
| JP | H08-244313 | 9/1996 |
| JP | H08-263525 | 10/1996 |
| JP | H08-263909 | 10/1996 |
| JP | H08-297957 | 11/1996 |
| JP | H09-44445 | 2/1997 |
| JP | H09-64571 | 3/1997 |
| JP | H09-82081 | 3/1997 |
| JP | H09-306094 | 11/1997 |
| JP | H09-319466 | 12/1997 |
| JP | H10-40021 | 2/1998 |
| JP | H10-49365 | 2/1998 |
| JP | H10-64173 | 3/1998 |
| JP | H10-98521 | 4/1998 |
| JP | H10-275137 | 10/1998 |
| JP | H10-281799 | 10/1998 |
| JP | H10-320128 | 12/1998 |
| JP | H10-340139 | 12/1998 |
| JP | H11-134852 | 5/1999 |
| JP | H11-139839 | 5/1999 |
| JP | H11-203201 | 7/1999 |
| JP | H11-213182 | 8/1999 |
| JP | H11-327800 | 11/1999 |
| JP | H11-353128 | 12/1999 |
| JP | H11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |

(56) References Cited

FOREIGN PATENT DOCUMENTS

| JP | 2000-125290 | | 4/2000 |
|---|---|---|---|
| JP | 2000-132704 | | 5/2000 |
| JP | 2000-149431 | | 5/2000 |
| JP | 2000-228686 | | 8/2000 |
| JP | 2000-235762 | | 8/2000 |
| JP | 2000-236188 | | 8/2000 |
| JP | 2000-242598 | | 9/2000 |
| JP | 2000-278647 | | 10/2000 |
| JP | 2000-305860 | | 11/2000 |
| JP | 2001-005501 | | 1/2001 |
| JP | 2001-023270 | | 1/2001 |
| JP | 2001-100925 | | 4/2001 |
| JP | 2002-042446 | | 2/2002 |
| JP | 2007-087498 | | 4/2007 |
| JP | 2007-188615 | | 7/2007 |
| JP | 2007-220184 | | 8/2007 |
| JP | 2007-293936 | | 11/2007 |
| JP | 2007-305206 | | 11/2007 |
| JP | 2007-305290 | | 11/2007 |
| JP | 2007-328761 | | 12/2007 |
| JP | 2008-503824 | | 2/2008 |
| JP | 2011-252717 | A | 12/2011 |
| JP | 2016-182000 | A | 10/2016 |
| KR | 1998-0035445 | | 8/1998 |
| KR | 10-1997-0017362 | | 11/1998 |
| KR | 10-0214308 | | 8/1999 |
| KR | 10-0403039 | | 10/2003 |
| KR | 10-2010-0112569 | A | 10/2010 |
| KR | 10-2423240 | B1 | 7/2022 |
| SG | 45223 | | 1/1998 |
| TW | 387574 | | 4/2000 |
| WO | 1989001682 | | 2/1989 |
| WO | 1997006532 | | 2/1997 |
| WO | 2000049487 | | 8/2000 |
| WO | 2000067253 | | 11/2000 |
| WO | 2001009627 | | 2/2001 |
| WO | 2001041148 | | 6/2001 |
| WO | 2003013783 | | 2/2003 |
| WO | 2003021597 | | 3/2003 |
| WO | 2003021598 | | 3/2003 |
| WO | 2003067385 | | 8/2003 |
| WO | 2004006260 | | 1/2004 |
| WO | 2004114286 | | 12/2004 |
| WO | 2005024830 | | 3/2005 |
| WO | 2005024831 | | 3/2005 |
| WO | 2005109131 | | 11/2005 |
| WO | 2006030185 | | 3/2006 |
| WO | 2006048611 | | 5/2006 |
| WO | 2006100441 | | 9/2006 |
| WO | 2006100445 | | 9/2006 |
| WO | 2007031729 | | 3/2007 |

OTHER PUBLICATIONS

Abraham et al., "Thermal Proximity Imaging of Hard-Disk Substrates," IEEE Transactions on Mathematics 36:3997-4004 (2000), 8 pages.

Abramovitch, "Rejecting Rotational Disturbances on Small Disk Drives Using Rotational Accelerometers," Proceedings of the 1996 IFAC World Congress in San Francisco, CA, (Jul. 1996), 8 pages.

Ali et al., "Modeling and Simulation of Hard Disk Drive Final Assembly Using a HDD Template," Proceedings of the 2007 Winter Simulation Conference, IEEE, pp. 1641-1650 (2007), 10 pages.

Anderson et al., "Clinical chemistry: concepts and applications," The McGraw-Hill Companies, Inc., pp. 131-132 (2003), 4 pages.

Anderson et al., "High Reliability Variable Load Time Controllable Vibration Free Thermal Processing Environment," Delphion, (Dec. 1993). hhttps://www.delphion.com/tdbs/tdb?order=93A +63418 (retrieved Mar. 18, 2009), 3 pages.

Asbrand, "Engineers at One Company Share the Pride and the Profits of Successful Product Design," Professional Issues, (1987), 4 pages.

Bair et al., "Measurements of Asperity Temperatures of a Read/Write Head Slider Bearing in Hard Magnetic Recording Disks," Journal of Tribology 113:547-554, (1991), 8 pages.

Bakken et al., "Low Cost, Rack Mounted, Direct Access Disk Storage Device," Delphion (Mar. 1977), Retrieved from URL: http://www.delphion.com/tdbs/tdb (retrieved Mar. 3, 2005), 2 pages.

Biber et al., "Disk Drive Drawer Thermal Management," Advances in Electronic Packaging, vol. 1:43-46 (1995), 5 pages.

Boigenzahn et al., "Rotational Vibration Suppressor," IBM Technical Disclosure Bulletin (Oct. 1991), 2 pages.

Cardinal Intellectual Property's search report completed Jan. 14, 2010, including the results of a search for the features of the claims included in the U.S. patent application entitled "Solid State Temperature Control of Hard Drive Tester", inventors: Brian S. Merrow and having assigned U.S. Appl. No. 12/105,103. The foregoing U.S. patent application is a continuation of U.S. Appl. No. 12/105,103, 8 pages.

Cardinal Intellectual Property's search report completed Apr. 4, 2010, including the results of a search for the features of the claims included in the U.S. patent application entitled "Disk Drive Clamping Transport and Testing", inventors: Brian S. Merrow et al., and having assigned U.S. Appl. No. 11/959,133. The foregoing U.S. patent application is a continuation of U.S. Appl. No. 11/959,133. Revised as of Apr. 4, 2010, 9 pages.

Cardinal Intellectual Property's search report completed Feb. 18, 2010, including the results of a search for the features of the claims included in the U.S. patent application entitled "Chilled Water Temp Control of Disk Drive Tester", inventors: Brian S. Merrow and having assigned U.S. Appl. No. 12/105,061. The foregoing U.S. patent application is a continuation of U.S. Appl. No. 12/105,061, 10 pages.

Cardinal Intellectual Property's search report completed Jan. 6, 2010, including the results of a search for the features of the claims included in the U.S. patent application entitled "Conductive Heating" inventors: Brian S. Merrow et al., and having assigned U.S. Appl. No. 12/503,593. The foregoing U.S. patent application is a continuation of U.S. Appl. No. 12/503,593, 7 pages.

Cardinal Intellectual Property's search report completed Jan. 7, 2010, including the results of a search for the features of the claims included in the U.S. patent application entitled "Conductive Temperature Sensing", inventors: Brian S. Merrow et al., and having assigned U.S. Appl. No. 12/503,687. The foregoing U.S. patent application is a continuation of U.S. Appl. No. 12/503,687, 7 pages.

Cardinal Intellectual Property's search report completed Jan. 13, 2010, including the results of a search for the features of the claims included in the U.S. patent application entitled "Test Slot Cooling System for a Storage Device Testing System", inventors: Merrow et al., and having assigned U.S. Appl. No. 12/503,567. The foregoing U.S. patent application is a continuation of U.S. Appl. No. 12/503,567, 8 pages.

Cardinal Intellectual Property's search report completed Feb. 17, 2010, including the results of a search for the features of the claims included in the U.S. patent application entitled "Storage Device Testing System Cooling", inventors: Brian S. Merrow and having assigned U.S. Appl. No. 12/698,575. The foregoing U.S. patent application is a continuation of U.S. Appl. No. 12/698,575, 13 pages.

Christensen, C., "How Can Great Firms Fail? Insights from the hard Disk Drive Industry," Harvard Business School Press, (2006), 28 pages.

Chung et al., "Vibration Absorber for Reduction of the In-plane Vibration in an Optical Disk Drive," IEEE Transactions on Consumer Electronics, vol. 48, No. 2, (May 2004), 6 pages.

Curtis et al., "In Phase Professional Archive Drive Architecture," In Phase Technologies, Inc., Retrieved from URL: http://www.science.edu/TechoftheYear/Nominees/InPhase (Dec. 17, 2007),6 pages.

Findeis et al., "Vibration Isolation Techniques Suitable for Portable Electronic Speckle Pattern Interferometry," Proc. SPIE, vol. 4704, pp. 159-167, Retrieved from URL: http://www.ndt.uct.ac.za/Paoers/soiendt2002.pdf (2002), 9 pages.

FlexStar Technology, 30E/Cascade Users Manual, Doc #98-36387-00 Rev. 1.8, (Jun. 1, 2004), 33 pages.

(56) References Cited

OTHER PUBLICATIONS

FlexStar Technology, "Environment Chamber Products," Retrieved from URL:http://www.flexstar.com, (1999), 1 page.
FlexStar Technology, "FlexStar's Family of Products," Retrieved from URL: http://www.flexstar.com, (1999), 1 page.
FlexStar Technology, "A World of Storage Testing Solutions," Retrieved from URL: http://www.flexstar.com, (1999), 1 page.
Frankovich, "The Basics of Vibration Isolation Using Elastomeric Materials," Aearo E-A-R Specialty Composites, Retrieved from URL: http://www.isoloss.com/11dfs/engineering/basicsofvibrationisolation, (2005), 8 pages.
Grochowski et al., "Future Trends in Hard Disk Drives," IEEE Transactions on Magnetics, vol. 32, No. 3, pp. 1850-1854 (May 1996), 5 pages.
Gurumurthi et al., "Disk Drive Roadmap from the Thermal Perspective: A Case for Dynamic Thermal Management," International Symposium on Computer Architecture, Proceedings of the 32nd Annual International Symposium on Computer Architecture, Technical Report CSE-05-001, pp. 38-49 (Feb. 2005), 22 pages.
Gurumurthi, "The Need for temperature-Aware Storage Systems," The Tenth Intersociety Conference on Thermal and Thermomechanical Phenomena in Electronics, pp. 387-394, (2006).
Gurumurthi et al., "Thermal Issues in Disk Drive Design: Challenges and Possible Solutions," ACM Transactions on Storage, 2(1):41-73 (Feb. 2006), 33 pages.
Haddad et al., "A New Mounting Adapter for Computer Peripherals with Improved Reliability, Thermal Distribution, Low Noise and Vibration Reduction," ISPS, Advances in Information Storage and Processing Systems, 1:97-108, (1995), 12 pages.
Henderson, "Had High Aerial Densities Require Solid Test Fixtures," Flexstar Technology, (Feb. 26, 2007), 3 pages.
Highbeam Research website, "ACT debuts six-zone catalytic gas heater. (American Catalytic Technologies offers new heaters)," Retrieved from URL: http://www.highbeam.com, (Oct. 26, 1998), 4 pages.
Highbeam Research website, "Asynchronous Testing Increases Throughput," Retrieved from URL: http://www.highbeam.com, (Dec. 1, 2000), 7 pages.
Highbeam Research website, "Credence announces Production Release of the EPRO AQ Series for Integrated Test and Back-end Processing," Retrieved from URL:http://www.highbeam.com, (1995), 4 pages.
Highbeam Research website, "Test Multiple Parts at Once for Air Leaks (Brief Article)," Retrieved from URL:http://www.highbeam.com (1999), 1 page.
"Last products of Disk-File Development at Hursley and Millbrook," IBM, Oct. 12, 1990, 43 pages.
"History of Disk-File Development at Hursley and Millbrook," IBM, Oct. 17, 1990, 45 pages.
Iwamiya, E., "Hard Drive Cooling Using a Thermoelectric Cooler," EEP—vol. 19-2, Advances in Electronic Packaging, vol. 2:2203-2208, ASME (1997), 6 pages.
Johnson et al., "Performance Measurements of Tertiary Storage Devices," Proceedings of the 24th VLDB Conference, New York, pp. 50-61, (1998), 12 pages.
Ku, C.-P., "Investigation of Hydrodynamic Bearing Friction in Data Storage information System Spindle Motors," ISPS—vol. 1, Advances in Information Storage and Processing Systems, pp. 159-165, ASME (1995), 7 pages.
Lindner, R. J., "Disk drive mounting," IBM Technical Disclosure Brochure, vol. 16, No. 3, pp. 903-904, (Aug. 1973), 3 pages.
Low et al., "Thermal network model for temperature prediction in hard disk drive," Microsyst. Technol., 15: 1653-1656 (2009), 4 pages.
McAuley, D., "Recursive Time Trapping for Synchronization of Product and Chamber Profiles for Stress Test," Delphion (Jun. 1988), Retrieved from URL: https://www.delphion.com/tdbs/tdb, (retrieved Mar. 18, 2009), 3 pages.
Morgenstern, D., "Micropolis Drives Target High-end Apps; Technology Provides Higher Uninterrupted Data Transfer. (Applications;

Microdisk AV LS 3020 and 1050AV and 1760AV LT Stackable Hard Drive Systems) (Product Announcement)," MacWEEK, vol. 8, No. 6, p. 8, (Feb. 7, 1994), 2 pages.
Morris, N., "Zero Cost Power and Cooling Monitor System," Delphion (Jun. 1994), Retrieved from URL: https://www.delphion.com/tdbs/tdb (retrieved Jan. 15, 2008), 3 pages.
Nagarajan, R., "Survey of Cleaning and Cleanliness Measurement in Disk Drive Manufacture," North Carolina Department of Environment and Natural Resources, pp. 13-21 (Feb. 1997), 8 pages.
Park et al., "Vibration and Noise Reduction of an Optical Disk Drive by Using a Vibration Absorber," IEEE Transactions on Consumer Electronics, vol. 48, No. 4, (Nov. 2002), 5 pages.
Prater et al., "Thermal and Heat-Flow Aspects of Actuators for Hard Disk Drives," 1994 InterSociety Conference on Thermal Phenomena, pp. 261-268, (1994), 8 pages.
Ruwart et al., "Performance Impact of External Vibration on Consumer-grade and Enterprise-class Disk Drives," Proceedings of the 22nd IEEE/13th Goddard Conference on Mass Storage Systems and Technologies, (2005), 9 pages.
Schroeder et al., "Disk Failures in the Real World: What does an MTTF of 1,000,000 hours mean to you?" In Fast'07: 5th USENIX Conference on File and Storage Technologies, San Jose, CA, (Feb. 14-16, 2007), 16 pages.
Schulze et al., "How Reliable is a Raid?" Compcon Spring 89, Thirty-Fourth IEEE Computer Society International Conference: Intellectual Leverage, pp. 118-123, (Feb. 27-Mar. 3, 1989), 6 pages.
Seagate Product Marketing, "Seagate's Advanced Multidrive System (SAMS) Rotational Vibration Feature," Publication TP-229D, (Feb. 2000), 4 pages.
Suwa et al., "Evaluation System for Residual Vibration from HDD Mounting Mechanism," IEEE Transactions on Magnetics, vol. 35, No. 2, pp. 868-873, (Mar. 1999), 6 pages.
Terwiesch et al., "An Exploratory Study of International Product Transfer and Production Ramp-Up in the Data Storage Industry," The Information Storage Industry Center, Report 99-02, University of California, pp. 1-31, Retrieved from URL:http://www-iros.ucsd.edu/sloan/ (Jun. 1999), 31 pages.
Tzeng, H.-M., "Dynamic Torque Characteristics of Disk-Drive Spindle Bearings," ISPS—vol. 1, Advances in Information Storage and Processing Systems, pp. 57-63, ASME (1995), 7 pages.
Tzeng, H.-M., "Measurements of Transient Thermal Strains in a Disk-Drive Actuator," InterSociety Conference on Thermal Phenomena, pp. 269-274, (1994), 6 pages.
Wilson Laboratories, Inc., W7000 Disk Drive Analyzer Product Literature, Accessed Jan. 28, 2009, 2 pages.
Winchester, S., "Automation Specialists Use Machine Vision as a System Development Tool," IEEE Computing & Control Engineering, (Jun./Jul. 2003), 4 pages.
*Xyratex Technology, Ltd.* v. *Teradyne, Inc.*, Amended Joint Trial Exhibit List of Xyratex and Teradyne. Case No. CV 08-04545 SJO (PLAx), (Nov. 12, 2009), 1 page.
Xyratex Product Literature, "Redefining Storage Test: Xyratex's Automated 'Single Cell Environment' Technology," Automated Production Test Solutions, Retrieved from URL: http://www.xyratex.com/Products/production-test- system (1995-2008), 6 pages.
Xyratex, "Continuous Innovation—Production Test Systems," Storage Infrastructure—Production Test System, Retrieved from URL:http://www.xyratex.com/Products/production-test-system ( © 1995-2008), 1 page.
"Xyratex to Debut its New Automated Test Solution for 2.5-Inch Disk Drives at Diskcon USA 2004," PR Newswire Europe, (2004), 2 pages.
*Xyratex Technology, Ltd.* v. *Teradyne, Inc.*, "Exhibit 1," Newspaper picture that displays the CSO tester (1990), 2 pages.
*Xyratex Technology, Ltd.* v. *Teradyne, Inc.*, "Exhibit 2," Photos of the CSO tester obtained from Hitachi, (1990), 8 pages.
*Xyratex Technology, Ltd.* v. *Teradyne, Inc.*, "Exhibit 1314," Case, "Last products of Disk-File Development at Hursley and Millbrook," IBM, (Oct. 12, 1990), 43 pages.
*Xyratex Technology, Ltd.* v. *Teradyne, Inc.*, "Exhibit 1315," Case, "History of Disk-File Development at Hursley and Millbrook," IBM, (Oct. 17, 1990), 45 pages.

(56)        References Cited

OTHER PUBLICATIONS

*Xyratex Technology, Ltd.* v. *Teradyne, Inc.*, "Exhibit 1326," Image of the back of Exhibit 1 and Exhibit 2 photos, which display the photos dates, (1990), 4 pages.

Xyratex, "Key Advantages—Production Test Systems," Storage Infrastructure, Production Test System, Retrieved from URL:http://www.xyratex.com/Products/production-test-system (1995-2008), 3 pages.

*Xyratex Technology, Ltd.* V. *Teradyne, Inc.*, Teradyne, Inc's Prior Art Notice Pursuant to 35; U.S.C. Section 282. Case No. CV 08-04545 SJO (PLAx), (Oct. 16, 2009), 1 page.

Wray, A., Xyratex, "Process Challenges in the Hard Drive Industry" slide presentation, Asian Diskcon (2006), 12 pages.

Xyratex, "Redefining Storage Test," Storage Infrastructure, Production Test Systems, Retrieved from URL:http:// www.xyratex.com/Products/production-test-system ( © 1995-2008), 1 page.

Xyratex, "The Need for a Different Paradigm: Why Change?" Storage Infrastructure—Production Test System, ( © 1995-2008), 1 page.

Xyratex, "HDD Assembly and Test," Storage Infrastructure, Retrieved from URL:http://www.xyratex.com/Products/storage-infrastructure/default.aspx ( © 1995-2008), 1 page.

Xyratex, "Testing Drives Colder," Storage Infrastructure, Production Test Systems, Retrieved from URL:http:// www.xyratex.com/Products/production-test-system ( © 1995-2008), 1 page.

International Preliminary Report on Patentability received for PCT Patent Application No. PCT/US2024/028105, mailed on Nov. 27, 2025, 7 pages.

\* cited by examiner

TEST SYSTEMS CONFIGURED TO TEST DEVICES AT DIFFERENT TEMPERATURES

TECHNICAL FIELD

This specification describes example implementations of test systems configured to test devices at different temperatures.

BACKGROUND

A test system is configured to test the operation of a device. A device tested by the test system is referred to as a device under test (DUT). The test system may include test instruments to send commands such as signals and data to the DUT for testing. The DUT responds with response data. The test system expects the response data to have certain values. If the response data has those values, the DUT passes testing. If the response data does not have those values, then the DUT may fail testing.

The DUTs are tested for operation at different temperatures. For example, the DUTs may be heated then tested and may be cooled then tested. FIG. 1 shows an example test system 10 in which DUTs 12 are heated or cooled using an air flow that moves in the direction of arrows 14. DUTs at the beginning 15 of the air flow receive air at an appropriate temperature. DUTs that are not at the beginning of the air flow, and particularly DUTs that are at the end 16 of the air flow across the DUTS, receive air that has been heated by DUTs 12 along the path 14a of the air flow. As a result, temperature control of DUTs in such a system may be inconsistent across the various DUTs, which can make testing under different thermal conditions challenging in some cases.

SUMMARY

An example test system includes a plenum including an air inlet, and a rack including slots to hold devices under test. The rack is adjacent to the plenum. The slots are arranged on the rack in a matrix such that part of each device held in a slot borders the plenum and is in fluid communication with the air inlet. One or more blowers are configured to force temperature-conditioned air into the air inlet of the plenum to thereby increase air pressure in the plenum and force the temperature-conditioned air over the devices and out of the plenum. The example test system may include one or more of the following features, either alone or in combination.

The plenum is a first plenum and the test system may include a second plenum. The slots may be arranged on the rack in the matrix such that part of each device held in a slot also borders the second plenum. The temperature-conditioned air may be forced over the devices into the second plenum.

Each slot may be configured to hold a corresponding device so that there is an air gap in the slot. The air gap may be configured for directing air from the plenum over a surface of the corresponding device. Each slot may be configured to hold the corresponding device so that there are air gaps adjacent to different surfaces of the corresponding device. Each air gap may be configured for directing air from the plenum over a different surface of the corresponding device.

The test system may include a heater to produce temperature-conditioned air that is above room temperature. The test system may include a coolant to produce temperature-conditioned air that is below room temperature. The temperature-conditioned air may be between −40° Celsius (C) and 100° C.

The test system may include test instruments that are external to the plenum, and cables that connect the test instruments to the devices. The test system may include glands that are sealed to the plenum. The cables may pass through the glands.

The glands may include an elastomeric material. In some examples, the test system does not include air movers dedicated to (e.g., inside of or associated with) individual slots.

The rack may have a first side facing the first plenum and a second side facing the second plenum. The test system may include temperature sensors on the first side and/or on the second side. The temperature sensors produce readings indicative of temperature in a region of the DUTs. The temperature sensors may be spaced in a regular pattern across the matrix. The test system may have fewer temperature sensors than there are slots in the test system.

The test system may include a control system to control the one or more blowers based on the readings and/or to control at least one of an air heating system or an air cooling system. The control system may include a proportional-integral-derivative controller. The control system may be configured to obtain temperature readings from the devices. The control system maybe configured to control the one or more blowers based also on the temperature readings from the devices. The control system may also be configured to control at least one of the air heating system or the air cooling system based on the temperature readings from the devices.

The test system may include adapters that fit into the slots. Each adapter may be for holding a corresponding device. The adapters may have different physical and/or electrical configurations to hold different types of devices at a same time within the rack.

The slots may be configured for manual loading and unloading of the devices.

The test system may include robotics to move the devices into and out of the slots.

Each device may be or include a solid state drive. A back of each solid state may face faces the first plenum, and a front of each solid state drive may face the second plenum.

The test system may be, or be part of, a batch tester. The batch tester may be configured for performing thermal testing of the devices as part of a group. In some examples, the batch tester is configured not to perform thermal testing on the devices individually, e.g., not to change the temperature of the devices individually but still to send and receive signals to individual devices for testing.

Any two or more of the features described in this specification, including in this summary section, may be combined to form implementations not specifically described in this specification.

At least part of the devices, systems, and processes described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the devices, systems, and processes described in this specification may be configured or controlled using a computing system comprised of one or more processing devices and memory storing instructions that are executable by the one or more processing devices to perform various control operations. The devices, systems, and processes described in this specification may be configured, for example, through design, construction, composition, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of a test system configured to control the temperature of devices during testing. The test system includes a rack having slots, each of which is configured to hold a device under test (DUT). Examples of types of DUTs that may be held in the slots and tested using the test system include, but are not limited to, storage devices such as solid state drives (SSDs) and hard disk drives, semiconductor devices such as microprocessors, and printed circuit boards (PCBs) containing one or more different types of electronic devices.

The rack is adjacent to a plenum containing temperature-conditioned air. The temperature-conditioned air may be cold air or hot air with, in some examples, cold air being below room temperature (e.g., 20° Celsius (C)) and hot air being above room temperature. In this regard, room temperature may vary and may be the temperature of the testing environment. The slots are arranged in a matrix such that part of each DUT in a slot borders the plenum and is in contact with the temperature-conditioned air in the plenum. For example, in the case of SSDs, the front or back of each SSD may border the plenum. Air from the plenum thus may be used to heat or to cool each SSD.

More specifically, the plenum is at least partially enclosed and includes an air inlet that is in fluid communication with one or more air blowers ("blowers"). The blower(s) are controllable to force heated or cooled air into the plenum. The air pressure in the plenum increases as a result of the introduction of this temperature-conditioned air into the plenum. The increase in air pressure in the plenum forces the temperature-conditioned air over the DUTs, thereby changing the temperature of the DUTs so that the DUTs can be tested at different temperatures.

Figure 1:
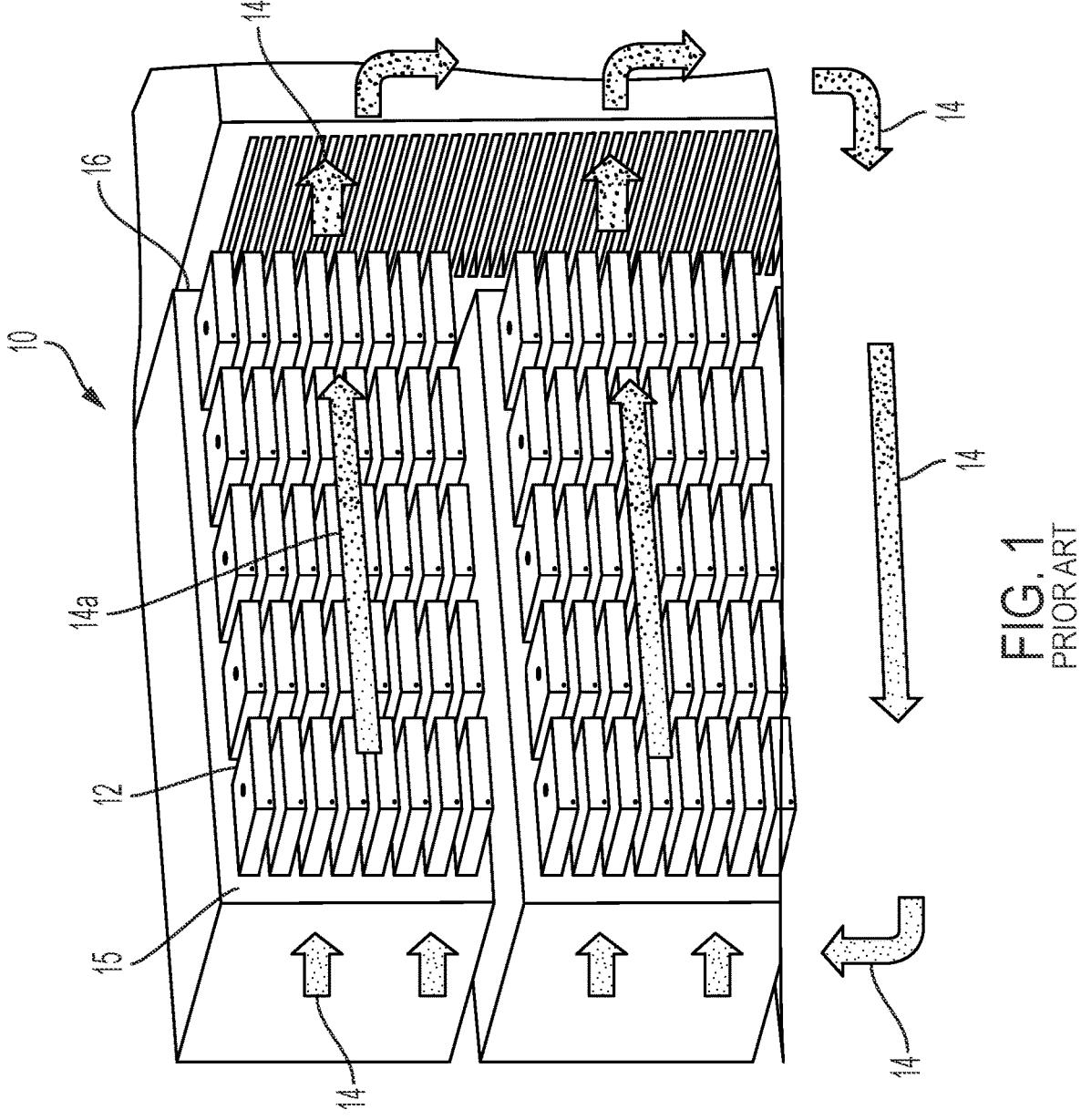
FIG. 1 is a block diagram showing components of a prior art test system.

The foregoing example configuration may have advantages. For example, because part of each DUT in a slot borders the plenum, each DUT is in contact with (for example, in direct contact with), and in a flow path of (for example, in a direct flow path of), the temperature-conditioned air in the plenum. Because each DUT receives air (for example, directly) from the plenum, in some examples the temperature control over each DUT may be substantially uniform. That is, the air impacting each DUT may be at substantially the same temperature, enabling substantially consistent temperature control for all the DUTs. This is in contrast to test systems described with respect to FIG. 1, where temperature-conditioned air flows across some DUTs causing the air to heat and thereby change temperature before reaching others of the DUTs.

Figure 2:
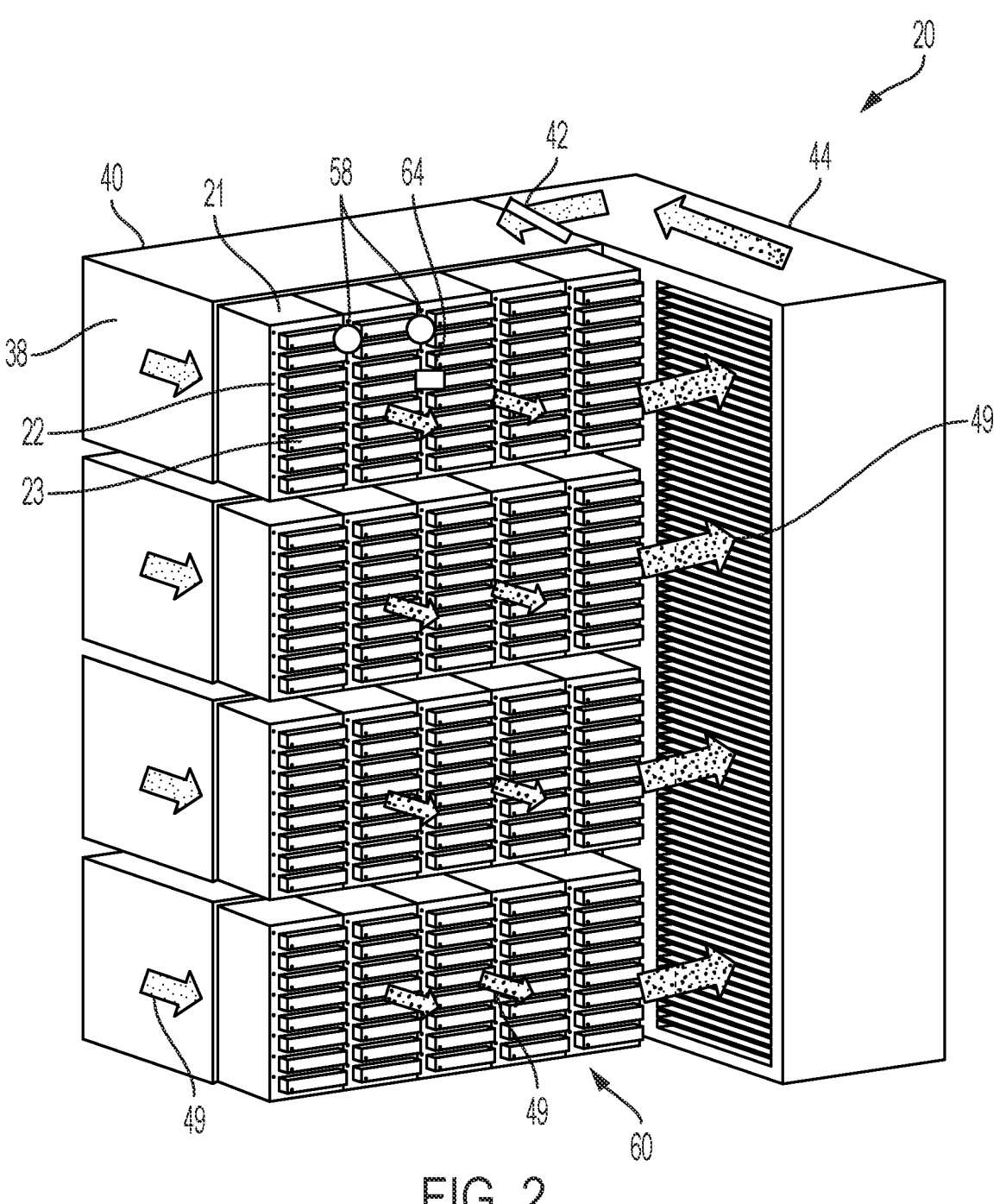
FIG. 2 is a block diagram showing a perspective view of components of an example test system for testing devices at different temperatures.
Figure 3:
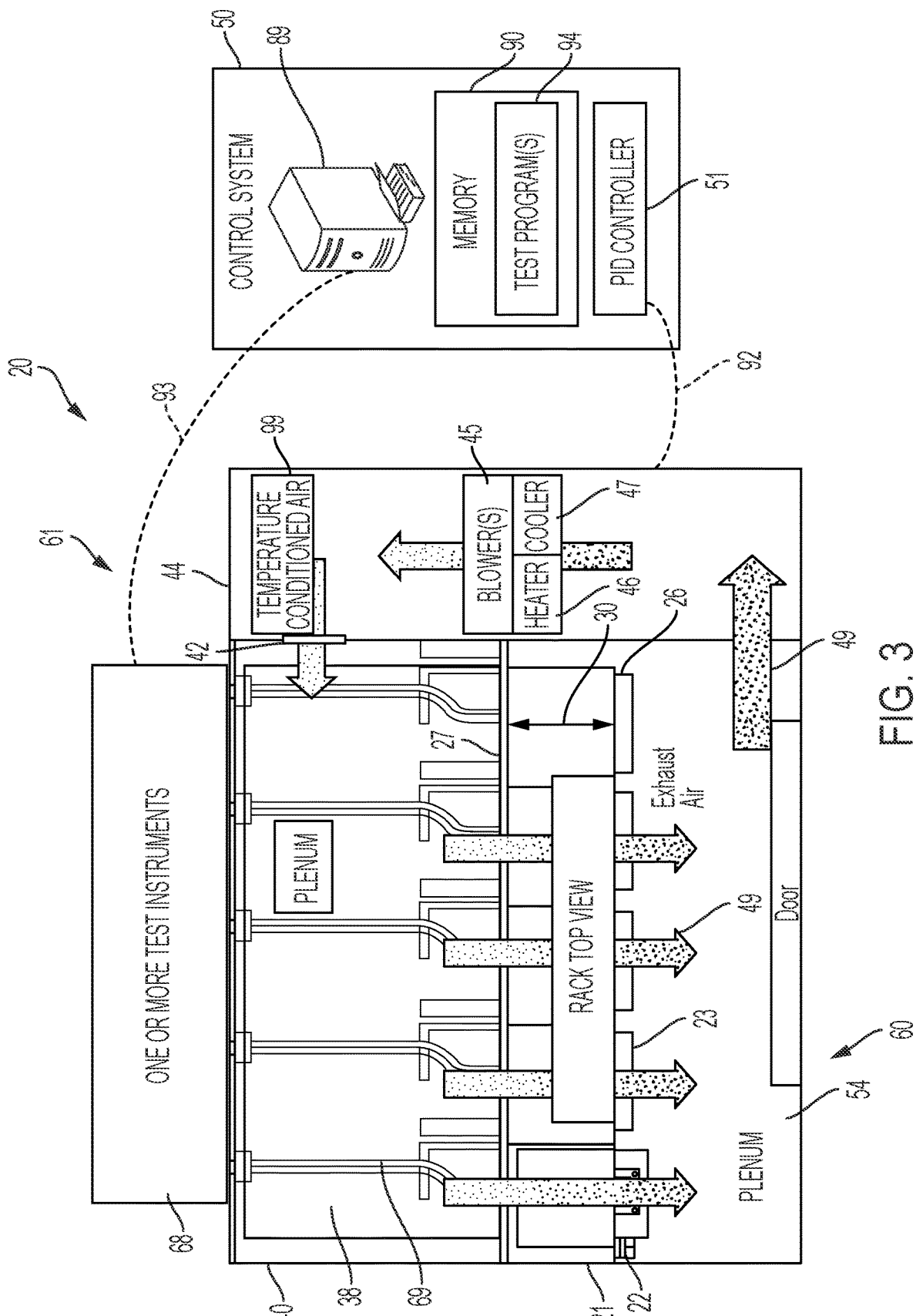
FIG. 3 is a block diagram showing a top view of components of the example test system of FIG. 2.
Figure 4:
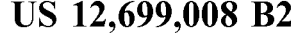
FIG. 4 is a block diagram showing a back perspective view of components of the example test system of FIG. 2.

FIG. 2 shows a front perspective view of components of example test system 20 FIG. 3 shows a top view of components of example test system 20; and FIG. 4 shows a back perspective view of components of example test system 20. As shown, in the figures, test system 20 contains a rack 21 that contains slots 22 arranged in a matrix. In the example, the matrix includes multiple columns and multiple rows of slots arranged linearly; however, other slot arrangements may be used. For example, columns and rows of slots may be arranged in a concave or convex semi-circle.

Each slot 22 is configured to hold a DUT 23 throughout a test cycle. An example test cycle includes sending test signals to the DUT and receiving response signals from the DUT over a range of different temperatures. Slots, such as slot 22a of FIG. 5, in the test system may include a ledge or other structure to support a corresponding DUT, such as an SSD. In the example of slot 22a, the ledge includes two parts 22b and 22c. The two parts hold the DUT and suspend the DUT above a floor 22d of the slot, thereby creating an air gap between the floor of the slot a bottom surface of the DUT. The slot and ledges also may be configured to create an air gap between the top surface of the DUT and a ceiling 22e of the slot. For example, a dimension 24 of the slot and a location of the ledge may be selected for a DUT so that there is an air gap between the DUT and the slot ceiling. For example, the dimension 24 of slot 22a between the ledge 22b, 22c and the ceiling 22e may be greater than the corresponding dimension of a DUT that fits within that slot for testing. Accordingly, in some implementations, there are multiple—e.g., two—air gaps adjacent to each DUT in each slot. The slots are open-ended at both ends 26, 27 thereof (FIG. 3); accordingly, the air gaps extend through an entirety of the slot to each end, at least in the dimension of arrows 30. The blown-up part 32 of FIG. 4 shows air gaps 34 and 35 at—for example, adjacent to—the top and bottom surfaces, respectively, of DUT 36 and extending across the entirety of DUT 36.

As shown in FIGS. 2 to 4, in this example, rack 21 borders plenum 38. In this example, plenum 38 includes a region comprised of an enclosure that holds air. Slots 22 are arranged relative to the plenum so that part of each DUT in each slot borders the plenum. In the example of FIGS. 2 to 4, the back of each DUT 23 borders the plenum; however, that need not be the case. For example, the slots may be configured so that the front or a side of each DUT borders the plenum. The plenum holds temperature-conditioned air for controlling temperatures of the DUTs in the slots. Temperature-conditioned air may include cold air or hot air, as explained above. In some implementations, the temperature-conditioned may vary on a continuum between –40° C. and 100° C., although other ranges may be used, such as between –20° C. and 80° C.

Plenum 38 is formed by an enclosure 40. The enclosure may be made of plastic or metal in some implementations. In the example of FIGS. 2 to 4, the enclosure has a rectangular cuboid shape; however, the shape may be different in other examples. For example, the enclosure may be cylindrical or partially spherical in shape in some implementations. In some implementations, the enclosure is air-tight except for a fluidic connection between the plenum and the slots, including the air gaps 34 and 35 in the slots containing DUTs. That is, the air gaps and plenum may be in fluid communication to allow air to flow from the plenum through the air gaps. Enclosure 40 includes an air inlet 42 to receive air from a source, such as one or more blowers.

Referring to FIGS. 2 and 3, air inlet 42 is in fluid communication with temperature conditioner 44. Temperature conditioner 44 may include a housing that houses one or more blowers 45 to direct air from outside the temperature conditioner into the plenum via air inlet 42. The one or more blowers may include two, three, or more blowers. Examples of blowers include air movers, fans, or the like. The temperature conditioner also may include a heater 46 to raise the temperature of air to above room temperature. The heater may include an electrical device having coils that heat in response to applied current. The temperature conditioner may include a cooler 47 to lower the temperature of air to below room temperature. The cooler may include a coolant, e.g., a refrigerant, such as hydrochlorofluorocarbon(s) that runs through thermally-conductive conduits to cool air. A Peltier device may be used both as a heater or a cooler in some examples. The housing of temperature conditioner 44 may be air-tight in some examples except for fluidic connections to plenum 38 and plenum 54 (described below).

As shown in FIGS. 2 and 3, air, referred to as "exhaust" air and represented by arrows 49, from outside of temperature conditioner 44 is suctioned into temperature conditioner 44 by operation of the blowers forcing air in the direction of arrows 49. This outside air is either heated or cooled by the temperature conditioner, depending on the type of testing to be performed in a current test cycle. A control system 50, as described below with respect to FIG. 3, may control operation of the blowers and the heater or cooler based on the type of thermal testing to be performed—e.g., testing at high temperatures or at low temperatures.

In some implementations, control system 50 includes a proportional-integral-derivative (PID) controller 51. An example PID controller includes a feedback controller that continuously calculates an error value as a difference between a setpoint (SP) and a measured process variable (here, temperature) and applies a correction based on proportional, integral, and derivative terms (denoted P, I, and D respectively). In this example, the PID controller receives temperature readings from sensors (described below) associated with rack 21 and/or the DUTs and compares those temperature readings to a target temperature set for thermal testing by a test program. The PID controller then controls the blowers and the heater and/or cooler to operate to reach the target temperature. For example, the PID controller may increase the temperature of the air by controlling heater 46, decrease the temperature of the air by controlling cooler 47, and/or control or speed of movement of the air by controlling blower(s) 45.

The temperature conditioner is configured and controlled to force the temperature-conditioned air into plenum 38. Because the enclosure 40 defining the plenum is at least partially air-tight, the temperature-conditioned air 99 (FIG. 3) forced into the plenum increases the air pressure in the plenum. This increased air pressure forces the temperature-conditioned air out of the plenum 38 via the air gaps 34, 35 (FIG. 4) in the slots 22. The effect of the air moving through the gap(s) adjacent to the DUTs, depending on the temperature of the air, is to cool the DUTs in the slots or to heat the DUTs in the slots. Furthermore, because, in some implementations, there are air gaps above and below the top and bottom surfaces of the DUTs, respectively, the cooling or heating may occur at a relatively rapid rate. In some implementations, there may be an air gap at the top surface of the DUT only or at the bottom surface of the DUT only. In these implementations, heating or cooling will still work using air from the plenum.

Figure 6:
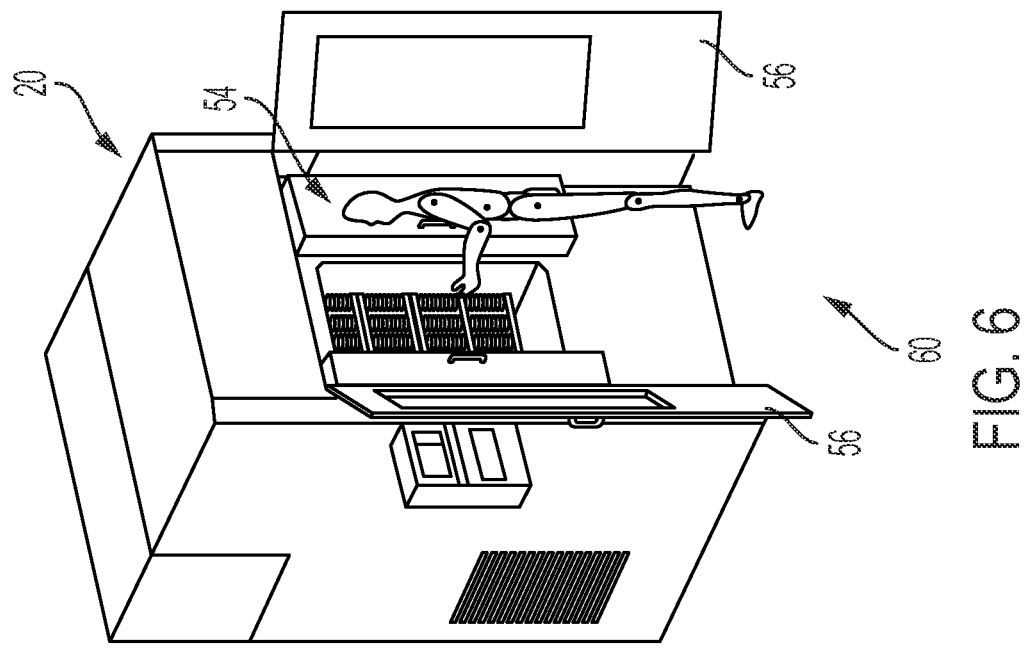
FIG. 6 is front perspective view of the test system of FIG. 2.

In some implementations, the exterior of the rack 21 is enclosed to form a second plenum 54 (FIG. 3), which may or may not be air-tight. Referring to FIG. 6, in some examples, the second plenum 54 is accessible through one or more doors 56 in the front region 60 of the test system. In some implementations, when the door(s) are closed, the combination the first plenum 38, the rack 21, the second plenum 54, and the temperature conditioner 44 form an air-tight or enclosed system. In some implementations, the system is not air-tight.

Referring to FIGS. 2 and 4, in some implementations the system may include temperature sensors 58 in the front region 60 of rack 21, the back region 61, or in both the front region 60 and the back region 61 of rack 21. Only two temperature sensors are shown in FIGS. 2 and 4 for illustration. There may be more than two temperature sensors in the front and back regions as follows. The temperature sensors may be spaced in a regular pattern or in an irregular pattern across the matrix of DUTs. For example, in some implementations, there may be one temperature sensor for each group of four slots 22; in some implementations, there may be one temperature sensor for each group of eight slots 22; and so forth. In some implementations, there may be one temperature sensor per slot. The arrangement of temperature sensors in the front region 60 and the back region 61 may be the same or different. For example, the front region may have one temperature sensor per group of four slots and the back region may have one temperature sensor per group of eight slots, or vice versa, and so forth.

The temperature sensors monitor the temperature at the front and/or back regions and provide that information to the control system. The control system, including the PID controller, uses readings from the temperature sensors to control the blower(s), the heater, and/or the cooler to achieve a target temperature, or to achieve a temperature within an acceptable range of the target temperature, at the DUTs. For example, a temperature within an acceptable range of the target temperature may vary from 1%, 2%, 3%, 4%, or 5%, and so forth from the target temperature.

In some implementations, the control system is configured to obtain temperature readings from the DUTs, e.g., through the connections between the DUTs and the test instruments. The control system, including the PID controller, uses the temperature readings from the DUTs to control the blower(s), the heater, and/or the cooler to achieve a target temperature, or to achieve a temperature within an acceptable range of the target temperature, at the DUTs. For example, as above, a temperature within an acceptable range of the target temperature may vary from 1%, 2%, 3%, 4%, or 5%, and so forth from the target temperature.

In some implementations, the control system may use temperature readings from both the DUTs and the temperature sensors to control the blower(s), the heater, and/or the cooler. For example, temperature readings may not be available from all DUTs in the racks, in which case temperature sensor readings may be used for DUTs not providing temperature readings. In implementations where both temperature sensor readings and temperature readings from the DUTs are available, the control system may give precedence to temperature readings from the DUTs when controlling the blower(s), the heater, and/or the cooler since those temperature readings constitute direct measurements of device temperature.

In some implementations, air movers (e.g., air mover 64, FIG. 2) such as fans may be located in the front region 61 of rack 21 to move air in the direction of arrows 49. For example, the air movers may be spaced in a regular pattern or an irregular pattern across the matrix of DUTs. For example, in some implementations, there may be one air mover for each group of four slots 22; in some implementations, there may be one air mover for each group of eight slots 22; and so forth. In some implementations, individual slots do not contain dedicated air movers; in other words, in such implementations there is not an air mover in an each slot. In some implementations, there may be an individual air mover in each slot. In some implementations, there may be air movers (not shown) in the back region spaced in a manner similar to, or different from, those in the front region to move air in the direction of arrows 49.

Figure 7:
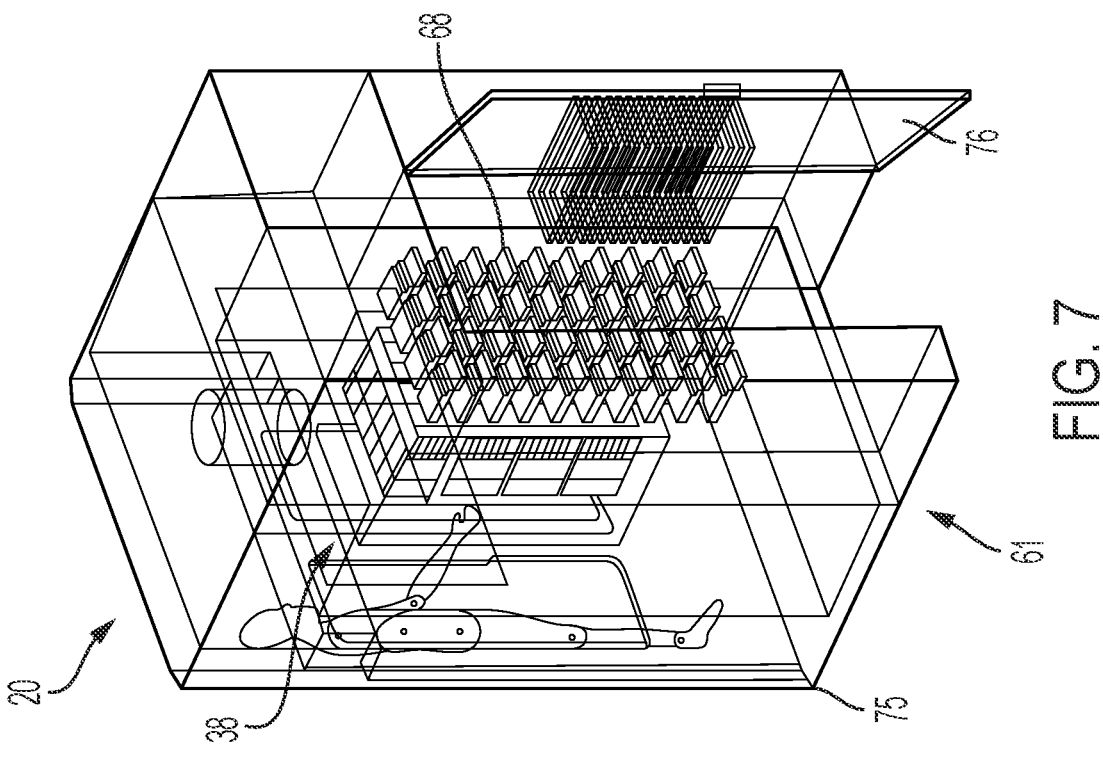
FIG. 7 is a partially transparent back perspective view of the test system of FIG. 2.

Referring to FIG. 3, one or more test instruments 68 are configured to test the DUTs in rack 21. The test instruments may be hardware devices that may include one or more processing devices and/or other circuitry. The test instruments may be configured—for example, programmed—to output commands to test DUTs held in rack 21. The commands to test the DUTs may be or include instructions, test signals, data, parameters, variables, test patterns, and/or any other information designed to elicit response(s) from the DUT. One or more—for example, all of—the test instruments may be configured to receive, from the DUT, responses to the commands sent from the test instruments to the DUT. The responses are in the form of response data. The test instruments may be configured to analyze the response data to determine whether the DUT has passed or failed testing. As shown in FIG. 7, the test instruments 68 may be within an enclosure 75 around the entirety of the test system 20 and may be accessible by opening one or more doors 76 in the back region of the test system. In this regard, the test instruments may be modular, with the access through door(s) 76 allowing replacement of individual ones of the test instruments.

As shown in FIGS. 3 and 7, in some implementations, the test instruments are not located within the plenum. In other words, the test instruments are exterior to the plenum. For example, as shown in FIG. 3, the test instruments 68 for testing the DUTs in the slots are located outside the plenum. Having the test instruments outside of the plenum may be advantageous in that the test instruments are not subjected to the temperature fluctuations within the plenum. Rather, as shown in FIGS. 3 and 4, cables 69, which pass through plenum 38 to the exterior of the plenum, connect the test instruments 68 to the DUTs 23 held in the slots. The cables 69 may have thermal shielding to reduce the effects of the temperature fluctuations on the cables during heating and cooling cycles in the plenum 38. For example, the thermal shielding may be polyvinyl chloride (PVC) or polyethylene. As shown in FIG. 4, glands 70 may act as the interface between the interior 72 and exterior 73 of the plenum. Each gland may be made of elastomeric material, such as foam or rubber, which creates an air-tight seal to the plenum's enclosure and an air tight seals to the cables through the gland. A close-up view of a gland 70 is shown in blown-up portion 71.

Figure 5:
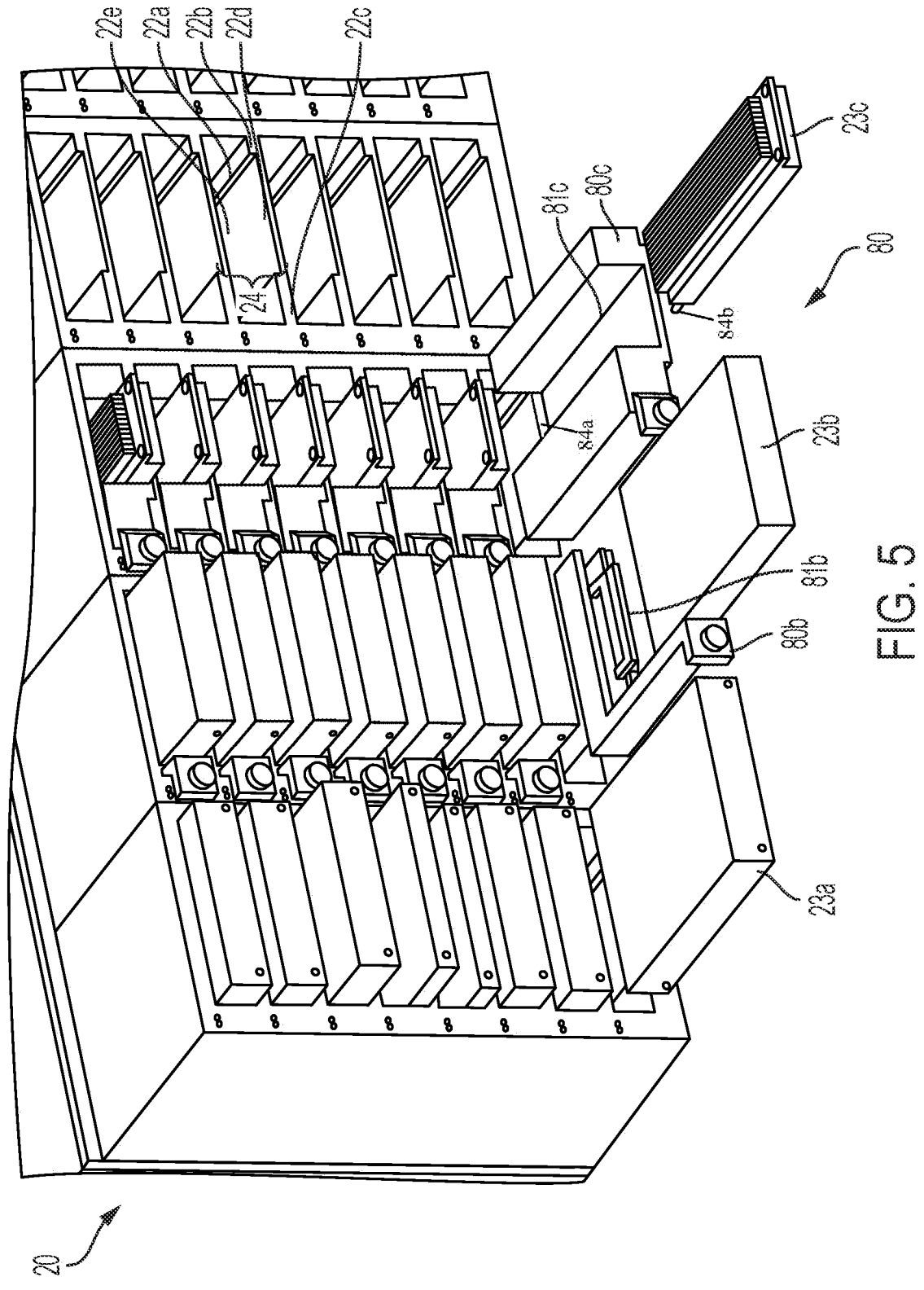
FIG. 5 is a front perspective view of slots in the test system of FIG. 2 and examples of adapters for use in the slots.

Referring to FIG. 5, in some implementations, the test system may include adapters 80. The adapters may be configured to fit within the test slots and to hold DUTs having sizes that are different, e.g., smaller, than the test slots. Some DUTS may have different electrical and mechanical connectors. The adapters may have complementary electrical and/or mechanical connectors to which such DUTS interface, while still having electrical and/or mechanical connectors that enable the adapters to fit into slots 22 and be used with the test system in the manner described herein. Different types of adapters may hold different types of DUTs. For example, adapter 80*b* may be configured to hold DUT 23*b*. In this example, the region 81*b* within adapter 80*b* that holds DUT 23*b* has a complementary shape to DUT 23*b* and complementary electrical connections to DUT 23*b*. Adapter 80*c* may be configured to hold DUT 23*c*. Adapter 80*c* includes a connector 84*a* that is complementary to a connector 84*b* on DUT 23*c*. Again, the region 81*c* that holds DUT 23*c* within adapter 80*c* has a complementary shape to DUT 23*c* and complementary electrical connections to DUT 23*c*. The adapters may each be configured to support air gaps above and/or below each DUT to enable air to flow from plenum 38 through rack 21 to heat or to cool the DUT in the adapter. As shown in FIG. 5, the test system may be operated to test different types of DUTs using different, or no, adapters (DUT 23*a*), concurrently; that is, at the same time.

In some implementations, test system 20 is a batch tester. An example batch tester tests DUTs by group. For example, during testing, the DUTs loaded into rack 21 may be thermally controlled as a group. More specifically, the DUTs may be thermally controlled as a group and then the individual DUTs may be tested by sending commands (e.g., test signals) from the test instruments to the DUTs and analyzing the DUTs responses. This type of testing may occur over a range of temperatures to determine whether the DUTs pass or fail testing. In some implementations, the test system 20 is configured not to provide thermal control over individual DUTs in the rack, e.g., not to provide independent temperature control over individual DUTs.

In some implementations, DUTs may be loaded into the rack manually and removed from the racks manually. In some implementations, a robotic arm (not shown) or other robotics may be used to load DUTs into the rack and to remove the DUTs from the rack. The DUTs may be loaded by opening door(s) 56 (FIG. 6) to access the racks. The doors may be open manually or using appropriate robotics.

Figure 8:
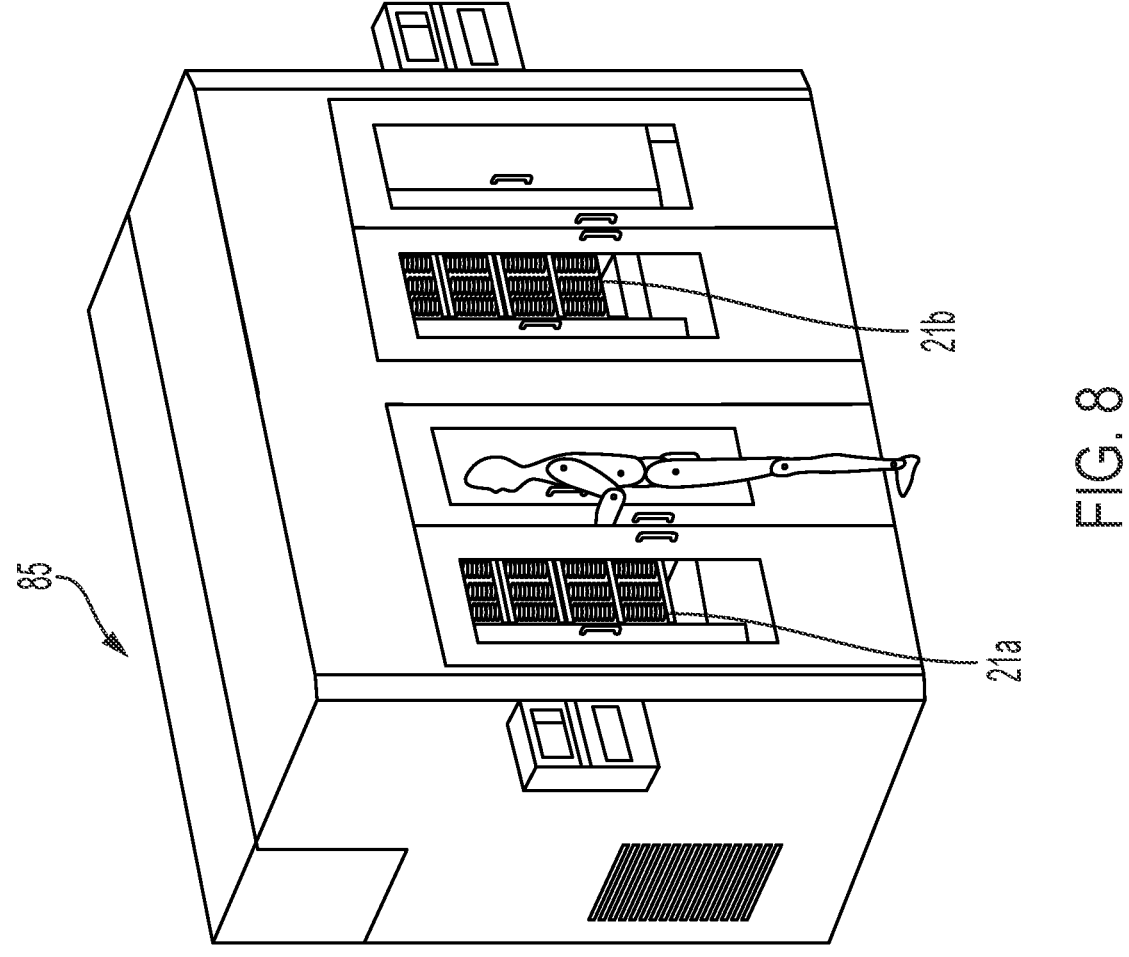
FIG. 8 is a front perspective view of an example test system having multiple racks containing slots for holding devices to test.

Referring to FIG. 8, an example test system 85 of the type described herein may be configured to control the temperatures of DUTs in more than one rack (e.g., two racks or more) 21*a* and 21*b* concurrently. That is, each rack 21*a* and 21*b* may include slots configured so that the DUTs contained therein are in direct contact with the same, or common, plenum. Air from the common plenum moves over the DUTs in the slots as described herein to heat or to cool the DUTs.

Referring to FIG. 3, control system 50 is configured to—e.g., programmed to—communicate with test instruments 68 to direct and/or to control testing of the DUTs in accordance with one or more test programs. Control system 50 may be configured to control temperature conditioner 44 in accordance with one or more test programs run by the control system. The control system may be or include a computing system comprised of one or more processing devices 89 (e.g., microprocessor(s)) and memory 90 for storage. The control system may communicate with the test instruments and the temperature conditioner over a wired and/or wireless connection(s) 92, 93. In an example, the control system 50 may be configured to execute the test program(s) 94 stored in memory 90 and may include the PID controller to control the blower(s), the heater, and the cooler to set the DUT temperatures to a target temperature specified in the test program(s). The control system may send test routines and/or commands to test instrument(s), which may send the commands, or execute the routines to send commands, to the DUTs in order to test the DUT after the DUTs are at a target temperature. The test instruments receive DUT response signals (e.g., measurement data) from the DUTs in response to the commands, and determine whether DUTs have passed or failed testing based on the measurement data or send the DUT response signals to the control system for analysis. Thereafter, the DUT temperature may be changed as described herein and the process may be repeated. This may occur for a range of temperatures specified by the test program(s).

All or part of the test systems and processes described in this specification and their various modifications may be configured or controlled at least in part by one or more computers such as control system 50 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

In the description and claims provided herein, the adjectives "first", "second", "third", and the like do not designate priority or order. Instead, these adjectives are used solely to differentiate the nouns that they modify.

Any mechanical or electrical connection herein may include a direct connection or an indirect connection that includes intervening components.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A test system comprising:
   a first plenum comprising an air inlet;
   a rack comprising slots to hold devices under test, the rack being adjacent to the first plenum, and the slots being arranged on the rack in a matrix such that part of each device held in a slot borders the first plenum and is in fluid communication with the air inlet;
   one or more blowers to force temperature-conditioned air into the air inlet of the first plenum to thereby increase air pressure in the first plenum and force the temperature-conditioned air over the devices and out of the first plenum; and
   a second plenum, the slots being arranged on the rack in the matrix such that part of each device held in a slot also borders the second plenum, the temperature-conditioned air being forced over the devices into the second plenum.

2. The test system of claim 1, wherein each slot is configured to hold a corresponding device so that there is an air gap in the slot, the air gap for directing air from the first plenum over a surface of the corresponding device.

3. The test system of claim 2, wherein each slot is configured to hold the corresponding device so that there are air gaps adjacent to different surfaces of the corresponding device, each air gap for directing air from the first plenum over a different surface of the corresponding device.

4. The test system of claim 1, further comprising a heater to produce temperature-conditioned air that is above room temperature.

5. The test system of claim 1, further comprising a coolant to produce temperature-conditioned air that is below room temperature.

6. The system of claim 1, wherein the temperature-conditioned air is between −40° Celsius (C) and 100° C.

7. The test system of claim 1, further comprising:
   test instruments that are external to the first plenum; and
   cables that connect the test instruments to the devices.

8. The test system of claim 1, wherein the test system does not include air movers dedicated to individual slots.

9. The test system of claim 1, wherein the rack has a first side facing the first plenum and a second side facing the second plenum; and wherein the test system further comprises:

temperature sensors on the first side and the second side, the temperature sensors producing readings; and a control system to control the one or more blowers based on the readings and to control at least one of an air heating system or an air cooling system.

10. The test system of claim 9, wherein the control system comprises a proportional-integral-derivative controller.

11. The test system of claim 10, wherein the temperature sensors are spaced in a regular pattern across the matrix.

12. The test system of claim 11, wherein the test system comprises fewer temperature sensors than there are slots in the test system.

13. The test system of claim 9, wherein the control system is configured to obtain temperature readings from the devices; and wherein the control system is configured to control the one or more blowers based also on the temperature readings from the devices, the control system also being configured to control at least one of the air heating system or the air cooling system.

14. The test system of claim 1, further comprising:

adapters that fit into the slots, each adapter for holding a corresponding device.

15. The test system of claim 1, wherein the adapters have different physical configurations to hold different types of devices at a same time within the rack.

16. The test system of claim 1, wherein the slots are configured for manual loading and unloading of the devices.

17. The test system of claim 1, further comprising:

robotics to move the devices into and out of the slots.

18. The test system of claim 1, wherein each device comprises a solid state drive, a back of each solid state drive faces the first plenum, and a front of each solid state drive faces the second plenum.

19. The test system of claim 1, wherein the test system is a batch tester, the batch tester for performing testing of the devices as part of a group.

20. The test system of claim 19, wherein the batch tester is configured not to perform testing on the devices individually.

21. The test system of claim 1, further comprising:

an adapter configured to fit within a slot of the test system and configured to hold a device under test (DUT), the adapter comprising:

a connector that is complementary to a connector of the DUT; and a structure having a shape that is configured to fit within the slot and that is complementary to a shape of the DUT, the adapter being configured to fit within the slot so as to produce an air gap above or below the adapter.

22. The test system of claim 21, wherein the connector comprises an electrical connector.

23. The test system of claim 21, wherein the connector comprises a mechanical connector.

24. The test system of claim 21, wherein the adapter is configured to fit within the slot so as to produce an air gap above the adapter between the slot and the adapter and an air gap below the adapter between the slot and the adapter.

25. A test system comprising:

a plenum comprising an air inlet;

a rack comprising slots to hold devices under test, the rack being adjacent to the plenum, and the slots being arranged on the rack in a matrix such that part of each device held in a slot borders the plenum and is in fluid communication with the air inlet;

one or more blowers to force temperature-conditioned air into the air inlet of the plenum to thereby increase air pressure in the plenum and force the temperature-conditioned air over the devices and out of the plenum;

test instruments that are external to the plenum;

cables that connect the test instruments to the devices; and glands that are sealed to the plenum, the cables passing through the glands.

26. The test system of claim 25, wherein the glands comprise an elastomeric material.

\* \* \* \* \*